United States Patent [19]

Masuda et al.

[11] Patent Number: 5,748,474
[45] Date of Patent: May 5, 1998

[54] DRIVING-FORCE CONTROL SYSTEM FOR A VEHICLE

[75] Inventors: Katsuhiko Masuda; Jun Aoki; Isamu Hashizume, all of Wako, Japan

[73] Assignee: Honda Giken Kogyo Kabushiki Kaisha, Tokyo, Japan

[21] Appl. No.: 794,537

[22] Filed: Feb. 3, 1997

Related U.S. Application Data

[63] Continuation of Ser. No. 350,058, Nov. 29, 1994, abandoned.

[30] Foreign Application Priority Data

Nov. 29, 1993 [JP] Japan ................. 5-298434

[51] Int. Cl.$^6$ .................................................. B60K 17/35
[52] U.S. Cl. .................... 364/426.036; 364/426.027; 364/426.029; 180/197
[58] Field of Search ................. 364/426.027, 426.029, 364/426.031, 426.032, 426.036; 180/197, 233, 240, 249

[56] References Cited

U.S. PATENT DOCUMENTS

| | | | |
|---|---|---|---|
| 4,663,983 | 5/1987 | Kobayashi et al. | 74/574 |
| 4,941,541 | 7/1990 | Ito et al. | 180/140 |
| 4,966,249 | 10/1990 | Imaseki | 180/233 |
| 4,966,250 | 10/1990 | Imaseki | 180/233 |
| 5,033,329 | 7/1991 | Tezuka | 74/866 |
| 5,074,371 | 12/1991 | Shibayama | 180/175 |
| 5,099,944 | 3/1992 | Kageyama et al. | 180/249 |
| 5,168,956 | 12/1992 | Namioka | 180/248 |
| 5,208,755 | 5/1993 | Tezuka | 364/426.03 |
| 5,259,476 | 11/1993 | Matsuno et al. | 180/197 |
| 5,287,941 | 2/1994 | Masuda et al. | 180/197 |
| 5,323,870 | 6/1994 | Parigger et al. | 180/197 |
| 5,332,059 | 7/1994 | Shirakawa et al. | 180/197 |
| 5,376,868 | 12/1994 | Toyoda et al. | 318/587 |
| 5,418,725 | 5/1995 | Eto | 364/426.03 |

FOREIGN PATENT DOCUMENTS

| | | |
|---|---|---|
| 2060782 | 8/1992 | Canada . |
| 2081291 | 4/1993 | Canada . |
| 2117295 | 6/1993 | Canada . |
| 1322393 | 9/1993 | Canada . |
| 2105756 | 3/1994 | Canada . |
| 2051249 | 11/1995 | Canada . |
| 0523698 A1 | 1/1993 | European Pat. Off. . |
| 2645084 | 5/1990 | France . |
| 3828656 A1 | 3/1990 | Germany . |
| 2-85050 | 3/1990 | Japan . |

*Primary Examiner*—Vincent N. Trans
*Attorney, Agent, or Firm*—Nikaido Marmelstein Murray & Oram LLP

[57] ABSTRACT

It is a purpose of the present invention to connect the operation of the driving-force distributing device with the operation of the driving-force reducing device at an appropriate timing to insure a stable performance of the vehicle. When a slip rate exceeds a predetermined value, a driving-force distributing device which includes a variable differential operation limiting device is first operated so as to hold a differential operation limiting torque at a predetermined value. If the slip rate further increases, a driving-force reducing device which includes a traction control device is operated so as to hold the engine output at a predetermined value. At that time, if slip rates of both racing inner wheel and racing outer wheel are further increased, the driving-force reducing device is operated to reduce the engine output.

16 Claims, 17 Drawing Sheets

DRIVING-FORCE CONTROL SYSTEM FOR A VEHICLE

This application is a continuation of application Ser. No. 08/350,058 filed Nov. 29, 1994, now abandoned.

FIELD OF THE INVENTION

The present invention relates to a driving-force control system for a vehicle, and more particularly, to a driving-force control system for a vehicle for controlling the operation of a driving-force distributing device and the operation of a driving-force suppressing device in connection with each other in accordance with a slipping state of a wheel.

BACKGROUND OF THE INVENTION

One conventionally well-known driving-force distributing device has a multi-plate friction clutch disposed between left and right driven wheels, so that the torque for the driven wheels is controlled by bringing the multi-plate clutch into an engaged state to distribute a predetermined differential operation limiting torque from the raced driven wheel to the non-raced driven wheel. In a vehicle including the driving-force distributing device, the racing of one wheel can be prevented by distributing a torque from the raced driven wheel to the non-raced driven wheel, thereby enhancing the driving performance. However, there is a possibility that the non-raced driven wheel, which receives the distributed torque, will start to race, resulting in a substantially reduced driving performance and exerting an influence to the stability of the vehicle.

Another conventionally well-known driving-force suppressing device reduces the engine output in accordance with a slipping state of a driven wheel to prevent excessive slipping of the driven wheel. In a vehicle including the driving-force suppressing device, the torque can be reduced during racing of the driven wheel to prevent excessive slipping. However, there is a possibility that the torque is reduced more than necessary, resulting in a reduced driving performance of the vehicle.

A driving-force control system including both the driving-force distributing device and the driving-force suppressing device is known from Japanese Patent Application Laid-Open No. 85050/90.

SUMMARY OF THE INVENTION

It is an object of the present invention to connect the operation of the driving-force distributing device with the operation of the driving-force suppressing device at an appropriate timing to insure a stable performance of the vehicle.

To achieve the above object, according to the present invention, there is provided a driving-force control system for a vehicle for controlling the operation of a driving-force distributing device for adjusting the distribution of a driving force between driven wheels, as well as the operation of a driving-force reducing device for reducing the driving-force for a wheel. The driving-force control system includes a first control device for maintaining the quantity of operation, of the driving-force distributing device during racing of both the driven wheels, at a predetermined value corresponding to the quantity of operation provided upon detection of the racing. A second control device enables the operation of the driving-force reducing device, when the quantity of operation of the driving-force distributing device is maintained by the first control means.

DESCRIPTION OF THE PREFERRED EMBODIMENTS

The present invention will now be described by way of an embodiment with reference to the accompanying drawings.

Figure 1:
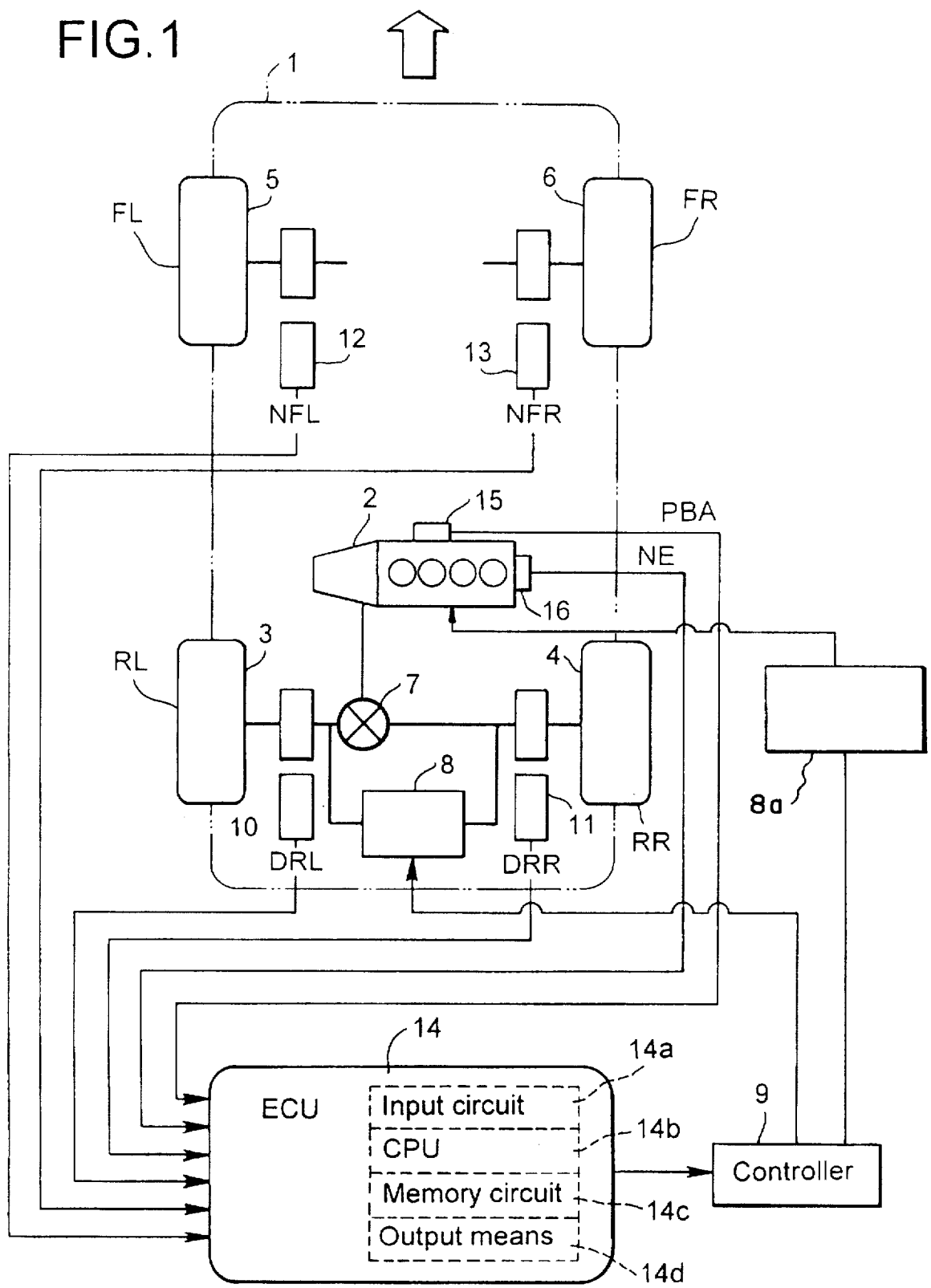
FIG. 1 is an diagrammatic illustration of the entire arrangement of an embodiment of a driving-force distribution control system for a vehicle according to the present invention.

FIG. 1 is a diagrammatic illustration of the entire arrangement of an embodiment of a driving-force distribution control system for a vehicle according to the present invention.

In FIG. 1, a reference number 1 is a rear engine and rear wheel drive vehicle (RR vehicle). An in-line type 4-cylinder internal combustion engine (which will be merely referred to as an engine hereinafter) 2 is disposed in place at a rear portion of the vehicle 1. A left rear wheel (RL) 3 and a right rear wheel (RR) 4, as driven wheels, are disposed in preselected locations at the rear portion of the vehicle 1. A left front wheel (FL) 5 and a right front wheel (FR) 6, as follower wheels, are disposed in preselected locations at a front portion of the vehicle 1.

The left rear wheel (RL) 3 and the right rear wheel (RR) 4 are connected to the engine 2 through a differential 7. During turning of the vehicle, the differential 7 provides a difference in number of revolutions between the left rear wheel (RL) 3 and the right rear wheel (RR) 4 and transmits a driving force from the engine at an equal distribution to the left rear wheel (RL) 3 and the right rear wheel (RR) 4.

A variable differential operation limiting device 8, as a driving-force distributing device including a multi-plate friction clutch or the like, is provided between a drive input portion and a drive output portion of the differential 7. The variable differential operation limiting device 8 is designed such that the differential operation limiting torque (LSD torque) applied thereto in accordance with a clutch engagement pressure can be varied by a hydraulic pressure generating device (not shown) driven by a controller 9. The LSD torque is distributed from the raced driven wheel, which is traveling) on a low-μ road section of on a split μ road or the like, to the non-raced driven wheel which is traveling on a high μ road section of the split μ road, thereby limiting the differential operations of the left and right rear wheels 3 and 4 as the driven wheels.

A left rear wheel revolution-number (DRL) sensor 10 and a right rear wheel revolution-number (DRR) sensor 11 are disposed in the vicinity of the left rear wheel (RL) 3 and the right rear wheel (RR) 4. A left front wheel revolution-number (NFL) sensor 12 and a right front wheel revolution-number (NFR) sensor 13 are disposed in the vicinity of the left front wheel (FL) 5 and the right front wheel (FR) 6. These DRL sensor 10, DRR sensor 11, NFL sensor 12 and the NFR sensor 13 detect the number of revolutions of the left rear wheel (RL) 3, the right rear wheel (RR) 4, the left front wheel (FL) 5 and the right front wheel (FR) 6 to supply electric signals indicative of the number of revolutions to an electronic control unit (which will be referred to as "ECU" hereinafter) 14.

An intake pipe internal absolute pressure (PBA) sensor 15 is provided in the middle of an intake pipe in the vicinity of an intake port (not shown) in the engine 2. The PBA sensor 15 is electrically connected to the ECU 14, so that an internal absolute pressure PBA in the intake pipe is converted into an electric signal and supplied to the ECU 14.

An engine revolution-number (NE) sensor 16 is provided at a preselected position around a periphery of a cam shaft (not shown) or a crankshaft (not shown) of the engine 2. The NE sensor 16 produces a signal pulse (which will be referred to as a TDC signal pulse hereinafter) at a predetermined crank angle position at every 180° rotation of the crankshaft of the engine and outputs it to the ECU 14.

Thus, the ECU 14 includes a) an input circuit 14a which functions to shape input signals from the various sensors to correct the voltage level into a predetermined level and to convert analog signal values to digital signal values, b) a central processing unit (which will be referred to as CPU hereinafter) 14b, c) a memory means 14c including a ROM and a RAM for storing various processing programs carried out in the CPU 14b, various maps which will be described hereinafter, processing results and the like, and d) an output circuit 14d for supply a command signal for the variable differential operation limiting device 8 to the controller 9. The ECU 14 measures an interval of generation of the TDC signal pulse to calculate an engine revolution-number NE.

Figure 2:
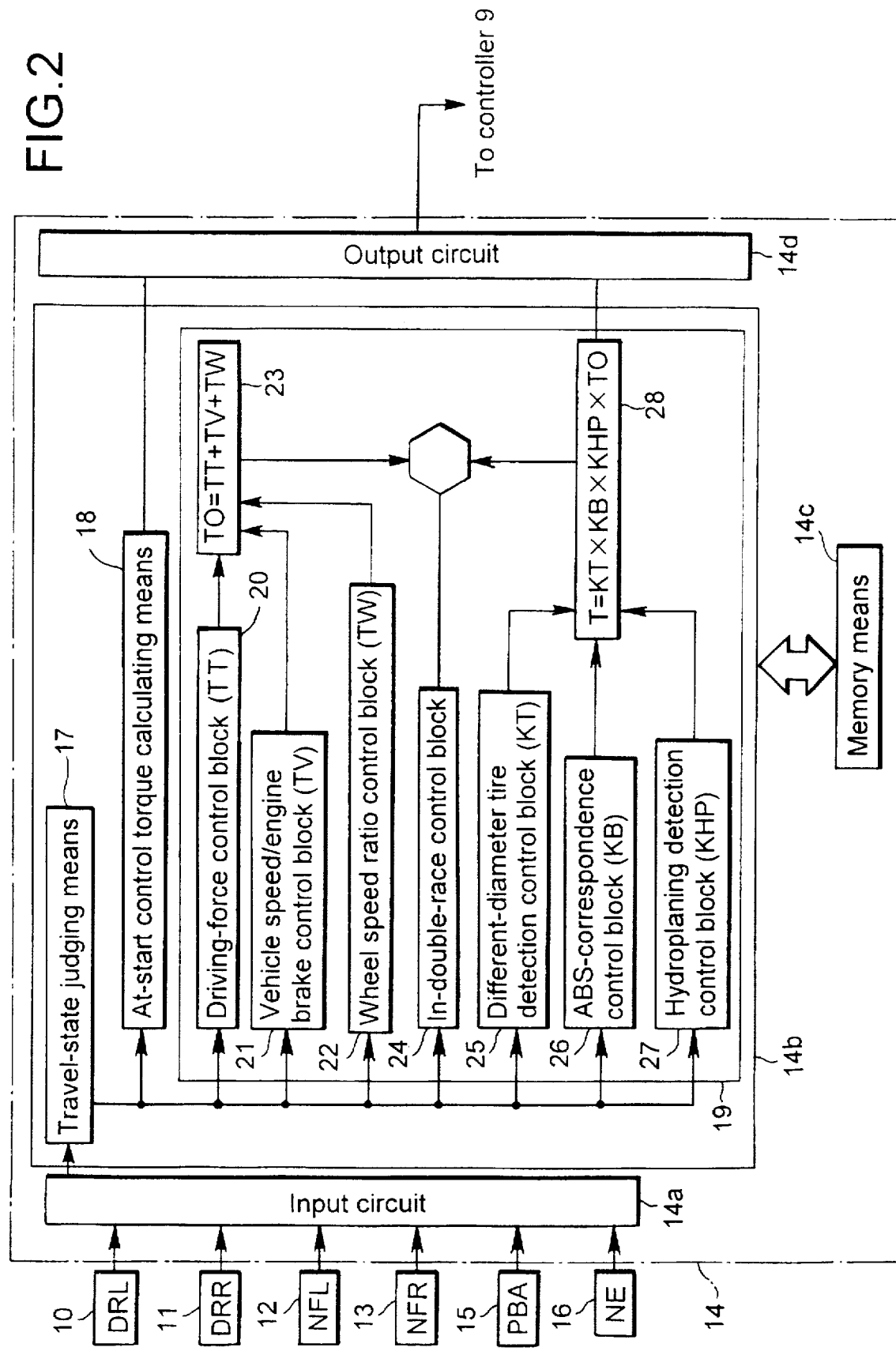
FIG. 2 is a block diagram illustrating contents of a control carried out in an ECU.

FIG. 2 is a block diagram illustrating a control performed in the ECU 14.

Output signals from the DRL sensor 10, the DRR sensor 11, the NFL sensor 12, the NFR sensor 13, the PBA sensor 15 and the NE sensor 16 are supplied through the input circuit 14a into the CPU 14b, where an LSD torque T is calculated. An output from the CPU 14b is supplied through the output circuit 14d to the controller 9.

The CPU 14b includes a travel-state judging means 17, an at-start control torque calculating means 18, and an in-travel control torque calculating means 19.

In the travel-state judging means 17, it is determined whether or not any three of the outputs from the four wheel speed sensors (i.e., the DRL sensor 10, the DRR sensor 11, the NFL sensor 12 and the NFR sensor 13) exceed a predetermined value (e.g., 3 to 4 km/hr.). Prior to the three outputs from the wheel speed sensors exceeding the predetermined value, an at-start control torque TS is calculated by the at-start control torque calculating means 18 and is delivered as an LSD torque T to the output circuit 14d.

If any three of the outputs from the wheel speed sensors exceed the predetermined value, wheel speeds are read respectively by the wheel speed sensors (i.e., the DRL sensor 10, the DRR sensor 11, the NFL sensor 12 and the NFR sensor 13), and an LSD torque T is calculated by the in-travel control torque calculating means 19 and is delivered to the output circuit 14d.

When the vehicle is started at an extremely low speed with the front wheels as steering wheels turned fully, the wheel speed of the inner rear wheel during turning is minimized. Even when the wheel speed is equal to or less than the predetermined value and is even non-detectable, the remaining three wheel speeds exceed the predetermined value and are detectable. Therefore, when an in-travel control is carried out by switching from an at-start control after the wheel speeds of the three wheels excluding one rear wheel of the four wheels have become detectable, at least the wheel sensors for the left and right front wheels (i.e., the NFL and NFR sensors 12 and 13) are in their detectable states, thereby preventing the result of the calculation of a wheel speed ratio from being diverged and applied as an excessively large LSD torque and moreover, making it possible to accurately calculate a vehicle speed which is determined by a higher one of the revolution-numbers of the left and right front wheels 5 and 6 which are the follower wheels.

In the in-travel control torque calculating means 19, an engine driving-force control torque TT is calculated in a driving-force control block 20 based upon an intake pipe internal absolute pressure PBA, wheel speeds and the like. A vehicle speed/engine brake control torque TV, depending upon the vehicle speed VN and the intensity of the engine brake, is calculated in a vehicle speed/engine brake control block 21. A wheel speed ratio control torque TW is calculated in a wheel speed ratio control block 22 based upon a wheel speed ratio determined from the number of revolutions of the left and right driven wheels (rear wheels) 3 and 4 and the left and right follower wheels (front wheels) 5 and 6. Then, the calculated control torques are added together in an adding means 23 according to a following equation (1) to provide a basic LSD torque TO.

$$TO=TT+TV+TW \qquad (1)$$

The in-travel control torque calculating means 19 also includes an in-double-race control block 24 for providing a control during racing of both wheels, so that even when both wheels are brought into their raced states during traveling on a snow-laden road or during turning of the vehicle, a given LSD torque T is maintained to prevent a reduction in stable performance during racing of the two wheels.

The in-travel control torque calculating means 19 also includes a different-diameter tire detection control block which calculates a different-diameter tire correcting factor KT. The corrector factor KT stops or reduces the application of the LSD torque T upon detection of the mounting of a different-diameter tire. An ABS-correspondence correcting factor KB is calculated in an ABS-correspondence control block 26 to maintain the applied LSD torque T at a predetermined value upon operation of an antilock brake system (which will be referred to as "ABS" hereinafter). A hydroplaning correcting factor KHP is calculated in a hydroplaning detection control block 27 for accommodating a situation in which a hydroplaning phenomenon is liable to be generated during traveling of the vehicle at a high speed. In a multiplying means 28, the basic LSD torque T0 is multiplied by the different-diameter tire correcting factor KT, the ABS-correspondence correcting factor KB and the hydroplaning correcting factor KHP according to a following equation (2) to provide an LSD torque.

$$T = KT \times KB \times KHP \times T0 \qquad (2)$$

The at-start control torque calculating means 18 and the in-travel control torque calculating means 19 will be described below in detail.

(1) At-Start Control Torque Calculating Means

Figure 3:
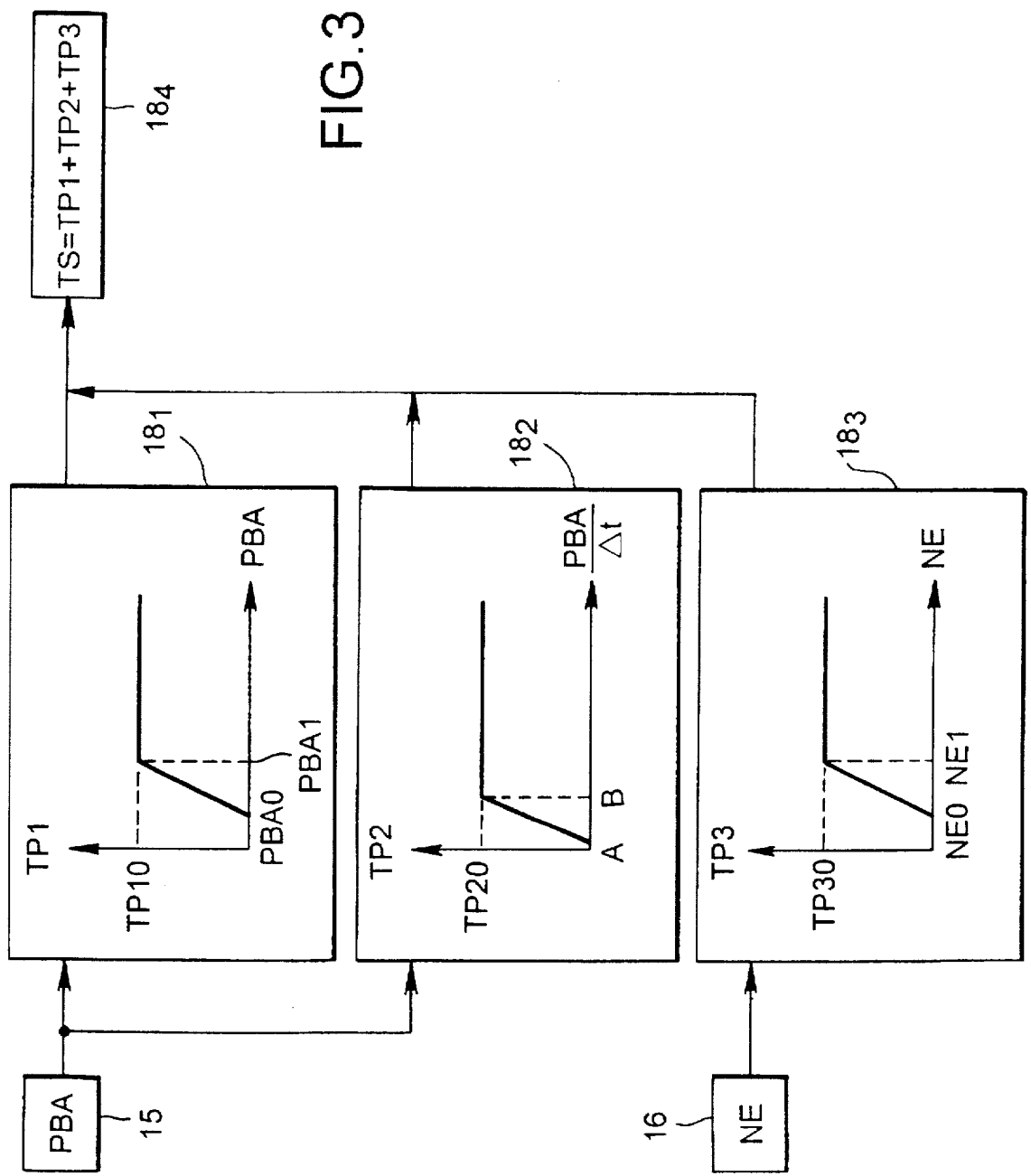
FIG. 3 is a control block diagram of an at-start control means.

As discussed above, at the start of traveling of the vehicle, the vehicle speed VN is small, and the wheel speeds of the four wheels (left and right front and rear wheels 3, 4, 5 and 6) cannot be read by the ECU 14. For this reason, as shown in FIG. 3, an LSD torque T (=TS) at the start is determined based upon the intake pipe internal absolute pressure PBA and the engine revolution-number NE.

More specifically, after reading the intake pipe internal absolute pressure PBA by the PBA sensor 15, a TP1 map $18_1$ and a TP2 map $18_2$, which are stored in the memory means 14c, are searched to calculate at-start control torques (i.e., a first at-start control torque TP1 and a second at-start control torque TP2) corresponding to the intake pipe internal absolute pressure PBA and the variation rate (PBA/Δt) thereof.

The TP1 map $18_1$ is established so that when the intake pipe internal absolute pressure PBA, with a throttle valve (not shown) of the engine 2 being in a substantially fully closed state, is equal to or less than a first extremely low predetermined value PBA0 (e.g., 100 mm Hg), the first at-start control torque TP1 is zero because the LSD torque is not required. The TP1 value is gradually increased with an increase in intake pipe internal absolute pressure PBA. When the intake pipe internal absolute pressure PBA becomes equal to or more than a second predetermined value PBA1 (e.g., 300 mm Hg), the first at-start control torque TP1 value is maintained at a predetermined value TP10 (e.g., 5 kg m). Therefore, if the LSD torque at the start is set at a value larger than necessary, the two wheels are likely to race. For this reason, when the intake pipe internal absolute pressure PBA becomes equal to or more than the predetermined value PBA1, the predetermined value TP10 is maintained. The first at-start control torque TP1 is read by searching the TP1 map $18_1$, or is calculated by an interpolation.

The TP2 map $18_2$ is established so that when the variation rate (PBA/Δt) of the intake pipe internal absolute pressure PBA is equal to or less than an extremely small predetermined value A, the second at-start control torque TP2 is zero (TP2=0). The TP2 is gradually increased with an increase in variation rate (PBA/Δt). When the variation rate (PBA/Δt) is equal to or more than a predetermined value B, the second at-start control torque TP2 value is maintained at a predetermined value TP20 (e.g., 5 kg m). The second at-start control torque TP2 is read by searching the TP2 map $18_2$, or is calculated by an interpolation. This makes it possible to accommodate the intake pipe internal absolute pressure which is suddenly varied by sudden depression of an accelerator pedal of the vehicle at the start. It should be noted that the reason why the second at-start control torque TP2 is set at zero (TP2=0) when the variation rate (PBA/Δt) is equal to or less than the predetermined value A is that it is not necessary to apply the LSD torque when the variation rate is extremely small.

When the engine revolution-number NE is read by the NE sensor 16, a TP3 map $18_3$, which is stored in the memory means 14c, is searched to calculate a third at-start control torque TP3 corresponding to the engine revolution-number NE.

The TP3 map $18_3$ is established so that when the engine revolution-number NE is equal to or less than a first predetermined revolution-number NE0 (e.g., 1000 rpm) near an idle revolution-number, the third at-start control torque TP3 is zero (TP3=0). When the engine revolution-number NE exceeds the first predetermined revolution-number NE0, the third at-start control torque TP3 is gradually increased. When the engine revolution-number NE is equal to or more than a second predetermined revolution-number NE1 (e.g., 3000 rpm), a predetermined value TP30 (e.g., 5 kg·m) is maintained. The third at-start control torque TP3 is read by searching the TP3 map $18_3$, or is calculated by an interpolation.

In an at-start torque calculating means $18_4$, the first, second and third at-start control torques TP1, TP2 and TP3 are added together to provide a final at-start control torque TS according to an equation (3), thereby completing the calculation of the LSD torque (=TS).

$$TS = TP1 + TP2 + TP3 \qquad (3)$$

Thus, even when the wheel speed cannot be read by the ECU 14, an LSD torque T suitable at the start can be delivered to the controller 9 based upon the intake pipe internal absolute pressure PBA and the engine revolution-number NE, thereby inhibiting the racing of the wheel at starting of the vehicle to provide an enhancement in driving performance of the vehicle at the start. As apparent from TP1 to TP3 maps $18_1$ to $18_3$, the torque TS at starting of the vehicle cannot become equal to or more than a predetermined value (e.g., 15 kg·m), because TP1 to TP3 are set at values equal to or less than the predetermined values TP10 to TP30. Therefore, even if the engine is raced by depression of the accelerator pedal to increase the engine revolution-number NE, for example, during garaging of the vehicle, the vehicle can be easily turned, thereby avoiding a vibration of the variable differential operation control device 8.

(2) In-Travel Control Torque Calculating Means
A) Driving-Force Control Block

Figure 4:
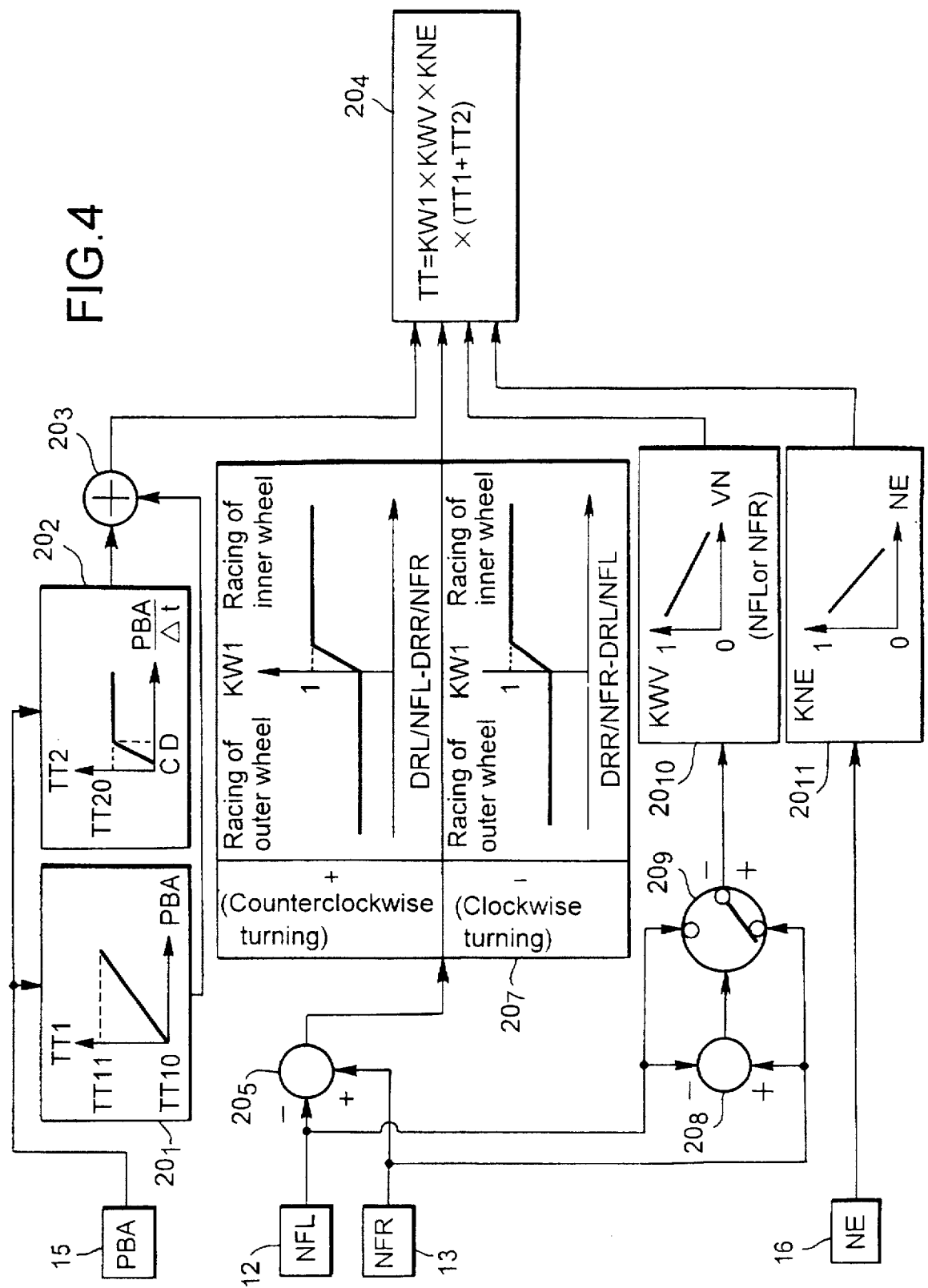
FIG. 4 is a control block diagram of a driving-force control block.

FIG. 4 is a control block diagram of the driving-force control block 20. In the driving-force control block 20, a driving-force control torque TT is calculated by multiplying a basic driving-force control torque calculated based upon an intake pipe internal absolute pressure PBA by a wheel speed correcting factor KW1, a vehicle speed correcting factor KWV and an engine revolution-number correcting factor KNE.

After reading the intake pipe internal absolute pressure PBA by PBA sensor 15, a TT1 map $20_1$ and a TT2 map $20_2$, which are stored in the memory means 14c, are searched to calculate basic driving-force control torques (i.e., a first basic driving-force control torque TT1 and a second basic driving-force control torque TT2) corresponding to the intake pipe internal absolute pressure PBA and the variation rate (PBA/Δt) thereof.

The TT1 map $20_1$ is established with its map value provided so that the first basic driving-force control torque TT1 is increased between TT10 (e.g., 0 kg·m) and TT1 (e.g., 100 kg·m) with an increase in intake pipe internal absolute pressure PBA. The first basic driving-force control torque TT1 is read by searching the TT1 map $20_1$, or is calculated by an interpolation.

The TT2 map $20_2$ is used for accommodating a sudden variation in the intake pipe internal absolute pressure PBA caused by sudden depression of the accelerator pedal of the vehicle, and is established, as is the above-described TP2 map $18_2$ (FIG. 3), so that when the variation rate (PBA/Δt) of the intake pipe internal absolute pressure PBA is equal to or less than a predetermined value C, the second basic driving-force control torque TT2 value is zero (TT2=0). When the variation rate (PBA/Δt) is equal to or more than a predetermined value D, the second basic driving-force control torque TT2 value is maintained at a predetermined value TT20 (e.g., 5 kg·m). The second basic driving-force control torque TT2 is read by searching the TT2 map $20_2$, or is calculated by an interpolation.

In this manner, the first and second basic driving-force control torques TT1 and TT2 are calculated based on the intake pipe internal absolute pressure PBA and the variation rate (PBA/Δt) thereof which are quicker in responsiveness than the variation in wheel speed, thereby making it possible to reduce the time lag for the application of the LSD torque T to the driven wheels.

The intake pipe internal absolute pressure PBA is determined depending upon the opening degree of the throttle valve operatively connected to the accelerator pedal and hence, the LSD torque can be determined to some extent by a driver.

The thus-calculated first and second basic driving-force control torques TT1 and TT2 are added to each other and supplied to a driving-force control torque calculating means $20_4$.

The wheel speeds of the left and right front wheels, as follower wheels read by the NFL and NFR sensors 12 and 13, are compared in a comparator means $20_5$ to determine whether the vehicle is being turned in a counterclockwise or clockwise direction. Wheel speed ratios during turning of the vehicle in the counterclockwise and clockwise directions are calculated according to the following expressions based on the wheel speeds of the left and right rear wheels 3 and 4 as the driven wheels read by the DRL and DRR sensors 10 and 11 and the wheel speeds of the left and right front wheels.

(i) During counterclockwise turning:
DRL/NFL–DRR/NFR (ii) During clockwise turning:
DRR/NFR–DRL/NFL When the counterclockwise or clockwise turning of the vehicle is determined, a KW1 map $20_7$, which is stored in the memory means 14c in correspondence to the above wheel speed ratio, is searched in each case to read a wheel speed ratio correcting factor KW1.

The KW1 maps $20_7$ are of two types used during counterclockwise and clockwise turnings, respectively, and both established at the same characteristic. In the KW1 map $20_7$ used during counterclockwise turning, the wheel speed ratio correcting factor KW1 is set so that it is a predetermined value less than "1" irrespective of a value of "DRL/NFL–DRR/NFR" during racing of the outer wheel (right rear wheel); is increased to "1" in response to an increase in value of "DRL/NFL–DRR/NFR" during racing of the inner wheel (left rear wheel) and thereafter, is maintained at "1".

In the KW1 map $20_7$ used during clockwise turning, the wheel speed ratio correcting factor KW1 is set so that it is a predetermined value less than "1" irrespective of a value of "DRR/NFR–DRL/NFL" during racing of the outer wheel (left rear wheel); is increased to "1" in response to an increase in value of "DRR/NFR–DRL/NFL" during racing of the inner wheel (right rear wheel) and thereafter, is maintained at "1".

Thus, a timing for application of the LSD torque T is determined in accordance with the raced state of the wheel, and the thus-determined wheel speed ratio correcting factor KW1 is delivered to the driving-force control torque calculating means $20_4$.

The wheel speeds of the left and right front wheels 5 and 6 detected by the NFL and NFR sensors 12 and 13 are also supplied to a comparator means $20_8$. A larger one of the wheel speeds of the left and right front wheels 5 and 6 as the follower wheels is selected as a vehicle speed VN by a selecting means $20_9$ connected to the comparator means $20_8$. In general, when the brake is operated when one of the front wheels is traveling on a low μ road, one front wheel slips and for this reason, the dropping of the wheel speed of the front wheel which is slipping is increased, as compared with the wheel speed of the other front wheel which is not slipping. Therefore, if an average value of the wheel speeds is determined as a vehicle speed, the deviation between the vehicle speed and an actual vehicle speed VN may be increased. Thus, the dropping of the wheel speeds of the left and right wheels 5 and 6 is prevented by selecting any larger one of the wheel speeds of the left and right front wheels 5 and 6 as a vehicle speed VN.

When the vehicle speed VN is determined by the selecting means $20_9$ in the above manner, a KWV map $20_{10}$, which is stored in the memory means 14c, is searched, thereby calculating a vehicle speed correcting factor KWV corresponding to the vehicle speed VN.

In the KWV map $20_{10}$, the map value is provided so that the KWV value is decreased with an increase of the vehicle speed VN. Thus, during traveling of the vehicle at a high vehicle speed VN, the behavior of the vehicle is likely to be unstable and hence, if a control torque similar to that during traveling of the vehicle at low speed is provided, the behavior of the vehicle is sensitive. Therefore, the stabilization of the vehicle behavior during traveling of the vehicle at a high speed is achieved by determining the vehicle speed correcting factor KWV so that it decreases with an increase in vehicle speed VN. Then, the vehicle speed correcting factor KWV calculated in this manner is supplied to the driving-force control torque calculating means $20_4$.

When the engine revolution-number NE is read by the NE sensor 16, a KNE map $20_{11}$, which is stored in the memory means 14c, is searched to calculate a revolution-number correcting factor KNE corresponding to the engine revolution-number NE.

Also, in the KNE map $20_{11}$, as in the KWV map $20_{10}$, the map value is provided so that the KNE value decreases with an increase in engine revolution-number NE. When the engine revolution-number NE is high, the variation in engine output is more violent, resulting in an unstable vehicle behavior. Thus the vehicle behavior is stabilized during traveling of the vehicle at a high speed by determining the revolution-number correcting factor KNE so that is decreases with an increase in engine revolution-number NE. Then, the revolution-number correcting factor KNE, calculated in this manner, is supplied to the driving-force control torque calculating means $20_4$.

Subsequently, a driving-force control torque TT is calculated in the driving-force control torque calculating means $20_4$ according to a following equation (4):

$$TT=KW1 \times KWV \times KNE \times (TT1+TT2) \qquad (4)$$

In this manner, the driving-force control torque TT is provided by a) determining the basic driving-force control torque in accordance with the intake pipe internal absolute pressure PBA and the variation rate thereof, b) determining the timing for application of the LSD torque from the wheel speed ratio during turning of the vehicle, and c) correcting the basic driving-force control torque by the vehicle speed VN and the engine revolution-number NE.

B) Vehicle Speed/Engine Brake Control Block

Figure 5:
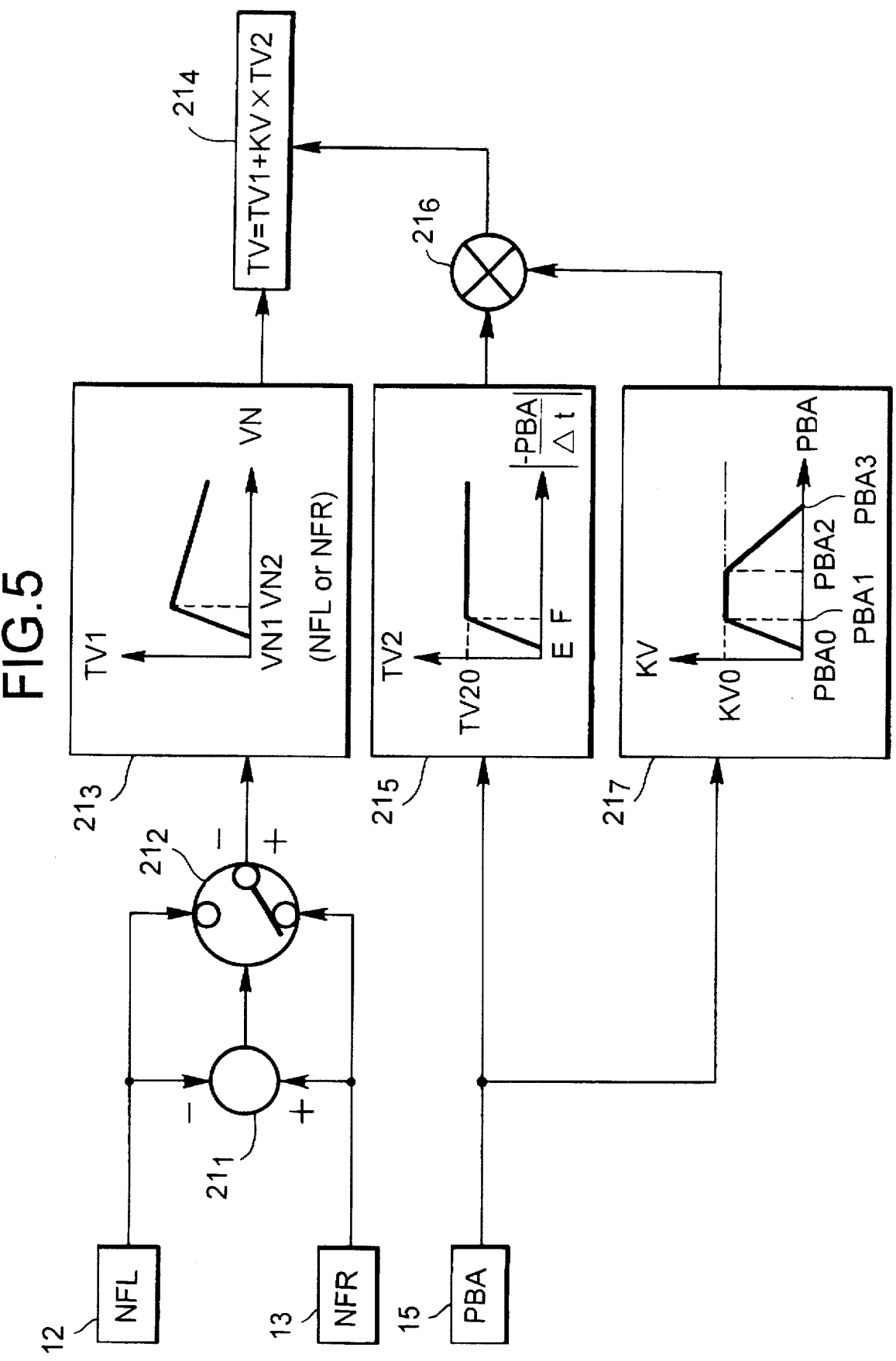
FIG. 5 is a control block diagram of a vehicle speed/engine brake control block.

FIG. 5 is a control block diagram of the vehicle speed/ engine brake control block.

First, a vehicle speed control torque TV1 is calculated based on the wheel speeds of the left and right front wheels 5 and 6.

As in the above-described driving-force control block 20, the wheel speeds of the left and right front wheels 5 and 6 detected by the NFL and NFR sensors 12 and 13 are supplied to a comparator means $21_1$, and the larger one of the wheel speeds of the left and right front wheels 5 and 6 is selected as a vehicle speed by a selecting means $21_2$ connected to the comparator means $21_1$.

A TV1 map $21_3$ which is stored in the memory means 14c, is searched to calculate a vehicle speed control torque TV1 corresponding to the vehicle speed VN.

The TV1 map $21_3$ is established so that when the vehicle speed VN exceeds a predetermined value VN1 (e.g., 50 km/hr), the vehicle speed control torque TV1 value starts to increase. When the vehicle speed VN exceeds a second predetermined value VN2, the vehicle speed control torque TV1 value is gradually decreased. In general, the effect of stabilization at a high speed and at the LSD torque is reduced with an increase in vehicle speed VN and hence, if a given control torque is continued to be applied, it is disadvantageous during traveling at a low speed such as during garaging of the vehicle. During traveling of the vehicle at a high speed, the higher the vehicle speed VN, the lower the stabilization effect, and if a given control torque is continued to be applied, an energy loss is produced. Therefore, a vehicle speed control torque required for the stabilization effect is applied during traveling at a high speed to inhibit the energy loss, thereby making it possible to insure a stability during straight traveling of the vehicle at the high speed.

The vehicle speed control torque $21_3$ calculated in this manner is supplied to a vehicle speed/engine brake control torque calculating means $21_4$.

In addition, the control of the engine brake is carried out based on the intake pipe internal absolute pressure PBA read by the PBA sensor 15. More specifically, when an engine brake is applied, the deceleration of the vehicle is increased which results in an increased variation in driving force and hence, the vehicle becomes unstable. When such an engine brake is applied, a desired control torque is applied to prevent the vehicle behavior from becoming unstable. Specifically, a TV2 map $21_5$, which is stored in the memory means 14c, is searched to calculate a basic engine brake control torque TV2 corresponding to a decrement ($-PBA/\Delta t$) of the intake pipe internal absolute pressure PBA.

The TV2 map $21_5$ is established so that when the decrement exceeds a predetermined value E, the basic engine brake control torque TV2 is increased, and when the decrement exceeds a second predetermined value F, the basic engine brake control torque TV2 is maintained at a predetermined torque TV20. Namely, the intensity of the engine brake can be presumed, and the basic engine brake control torque TV2 is read by searching the TV2 map $21_5$, or is calculated by an interpolation, and is supplied to a multiplying means $21_6$.

A KV map, which is stored in the memory means 14c, is also searched based on the intake pipe internal absolute pressure to calculate an engine brake correcting factor KV. In the KV map, a predetermined map value is provided in accordance with the intake pipe internal absolute pressure. Specifically, the KV map is established so that when the intake pipe internal absolute pressure exceeds a first predetermined value PBA0, the KV value starts to increase. When the intake pipe internal absolute pressure reaches a second predetermined value PBA1, the KV value is maintained at a given value KV0. When the intake pipe internal absolute pressure exceeds a third predetermined value PBA2, the KV value starts to decrease. When the intake pipe internal absolute pressure exceeds a fourth predetermined value PBA3, the KV value becomes zero ("0"). The reason why the KV value decreases in the above manner when the intake pipe internal absolute pressure exceeds the third predetermined value PBA2 is that the control of the engine brake is believed to be unnecessary, when the throttle valve is in the substantially fully opened state in which the intake pipe internal absolute pressure is large. It should be noted that the KV value may be determined so that it is maintained at a given value KVO when the intake pipe internal absolute pressure exceeds the second predetermined value PBA1 as shown by a two-dot dashed line.

The engine brake correcting factor KV, calculated in the above manner, is supplied to the multiplying means $21_6$ where it is multiplied by the basic engine brake control torque TV2.

This calculates a torque corresponding to a variation in driving force during deceleration of the vehicle which is being turned.

The torque value determined in the above manner is supplied to the vehicle speed/engine brake control torque calculating means $21_4$, where a vehicle speed/engine brake control torque TV is calculated according to an equation (5).

$$TV=TV1+KV \times TV2 \qquad (5)$$

This calculates an LSD torque in consideration of the compatibility of the stability during straight traveling of the vehicle at a high speed and the stability during deceleration of the vehicle which is being turned.

C) Wheel Speed Ratio Control Block

Figure 6:
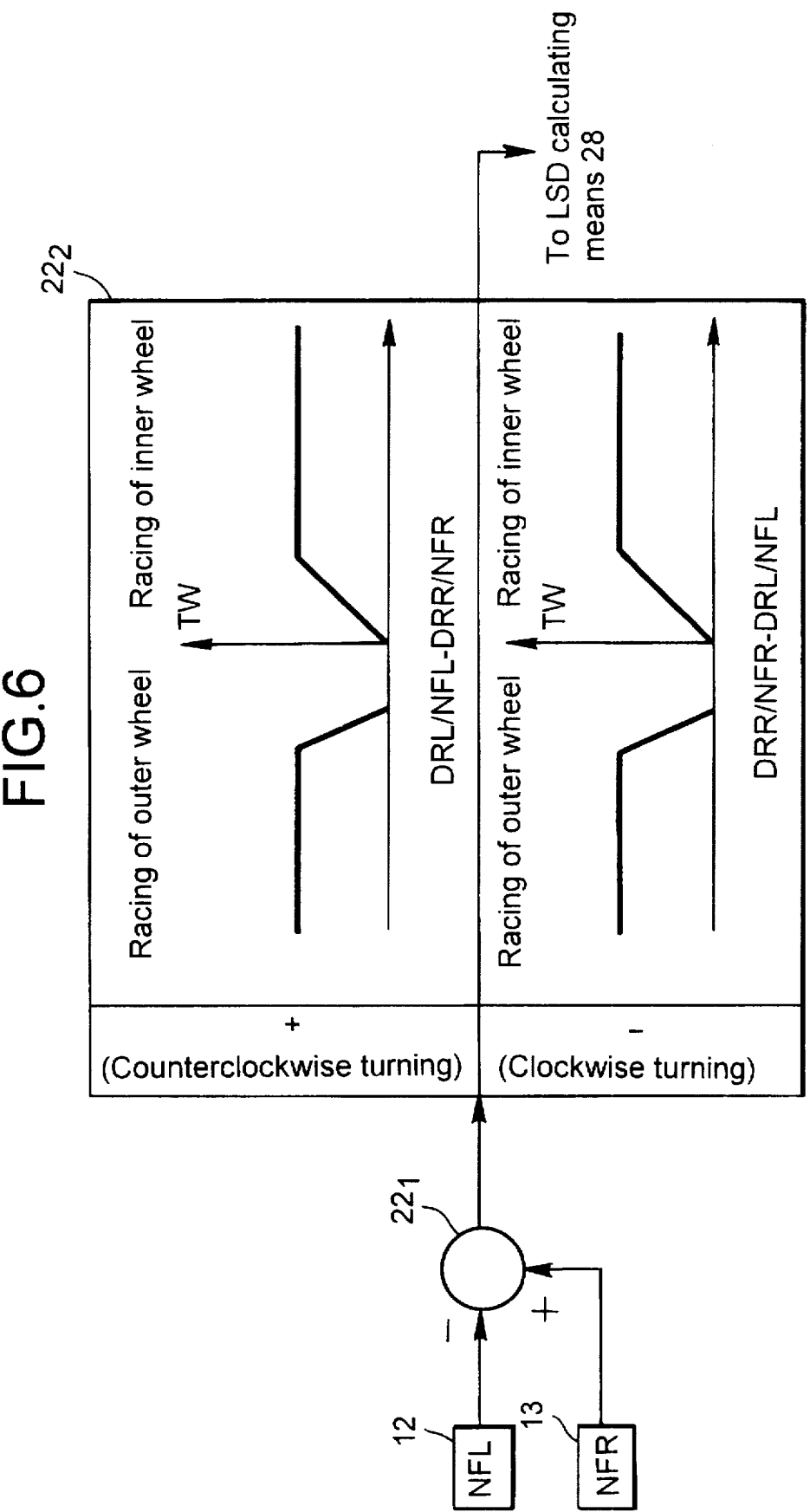
FIG. 6 is a control block diagram of a vehicle speed ratio control block.

FIG. 6 is a control block diagram of the wheel speed ratio control block. A wheel speed ratio control torque TW is calculated in the same manner as in the procedure of calculating the vehicle speed ratio correcting factor KW1 in the above-described driving-force control block 20. More specifically, wheel speeds of the left and right front wheels 5 and 6, as the follower wheels read by the NFL and NFR sensors 12 and 13, are compared with each other in a comparator means $22_1$ to determine whether the vehicle is being turned in a counterclockwise or clockwise direction.

In addition, a TW map $22_2$, which is stored in the memory means 14c, is searched based on wheel speeds of the left and right rear wheels 3 and 4 as the driven wheels read by the DRL and DRR sensors 10 and 11 and the wheel speeds of the left and right front wheels 5 and 6 as the follower wheels read by the NFL and NFR sensors 12 and 13, thereby calculating a control torque TW corresponding to the wheel speed ratio. The term "wheel speed ratio" used here is the same as the above-described wheel speed ratio. When the vehicle is being turned in the counterclockwise direction, the wheel speed ratio is represented by DRL/NFL−DRR/NFR, and when the vehicle is being turned in the clockwise direction, the wheel speed ratio is represented by DRR/NFR−DRL/NFL.

The TW maps $22_2$ are of two types used during counterclockwise turning and during clockwise turning of the vehicle, and both are established so that when the inner wheel is raced, the wheel speed ratio control torque TW is maintained at a given value after being increased from "0" with an increase in wheel speed ratio. When the outer wheel is raced, the wheel speed ratio control torque TW is maintained at "0" during a predetermined period and thereafter increased and maintained at a given value.

By providing the two types of TW maps $22_2$ used during counterclockwise turning and during clockwise turning of the vehicle, as described above, the number of maps can be decreased from 4 to 2, as compared with four types used during counterclockwise turning of the vehicle and racing of the outer wheel, during counterclockwise turning of the vehicle and racing of the inner wheel, during clockwise turning of the vehicle and racing of the outer wheel and during clockwise turning of the vehicle and racing of the inner wheel.

The use of four maps as described above is accompanied by the following problem: in a normal turning state of the vehicle, the wheel speed of the outer wheel is larger than that of the inner wheel and hence, the map for racing of the outer wheel is used. However, if the accelerator opening degree is increased during turning of the vehicle, the inner wheel starts to race, and at a point in time when the wheel speed of the inner wheel exceeds the wheel speed of the outer wheel, the map for racing of the outer wheel is switched to the map for racing of the inner wheel. In this manner, if the accelerator opening degree is increased during turning of the vehicle, the used map is switched at the point in time when the relationship between the wheels speeds of the inner and outer wheels is critical and for this reason, there is a possibility that a difference is produced in torque variation at the moment of the switching, resulting in an unstable vehicle behavior.

However, by establishing the wheel speed ratios DRL/NFL−DRR/NFR and DRR/NFR and DRL/NFL and by using the same TW map $22_2$ during a period while the turning direction is constant, the connection of the torque in the transfer from the normal turning state to the racing state of the inner wheel can be carried out smoothly.

Suppose that the front and rear wheels pass the substantially same locus during normal turning, the wheel speed ratio DRL/NFL−DRR/NFR and DRR/NFR−DRL/NFL is zero. If the inner wheel is raced from this state, the wheel speed ratio is varied toward plus, and the LSD torque T is applied, thereby stabilizing the vehicle behavior. However, if the LSD torque is applied when the outer wheel is suddenly raced due sand or the like to cause the wheel speed ratio to be varied toward minus, a excessively large torque is applied to the inner wheel, so that the inner wheel also slips, resulting in a very unstable vehicle behavior.

However, when the outer wheel races, the wheel speed ratio control torque TW is maintained at "0" during the predetermined period, as described above, and therefore, the application of the LSD torque T can be delayed to avoid such a disadvantage. Moreover, in the vehicle including a traction control device, the traction control device can be operated during such a time to stabilize the vehicle behavior.

D) Control During Racing of Both Wheels

Figure 7:
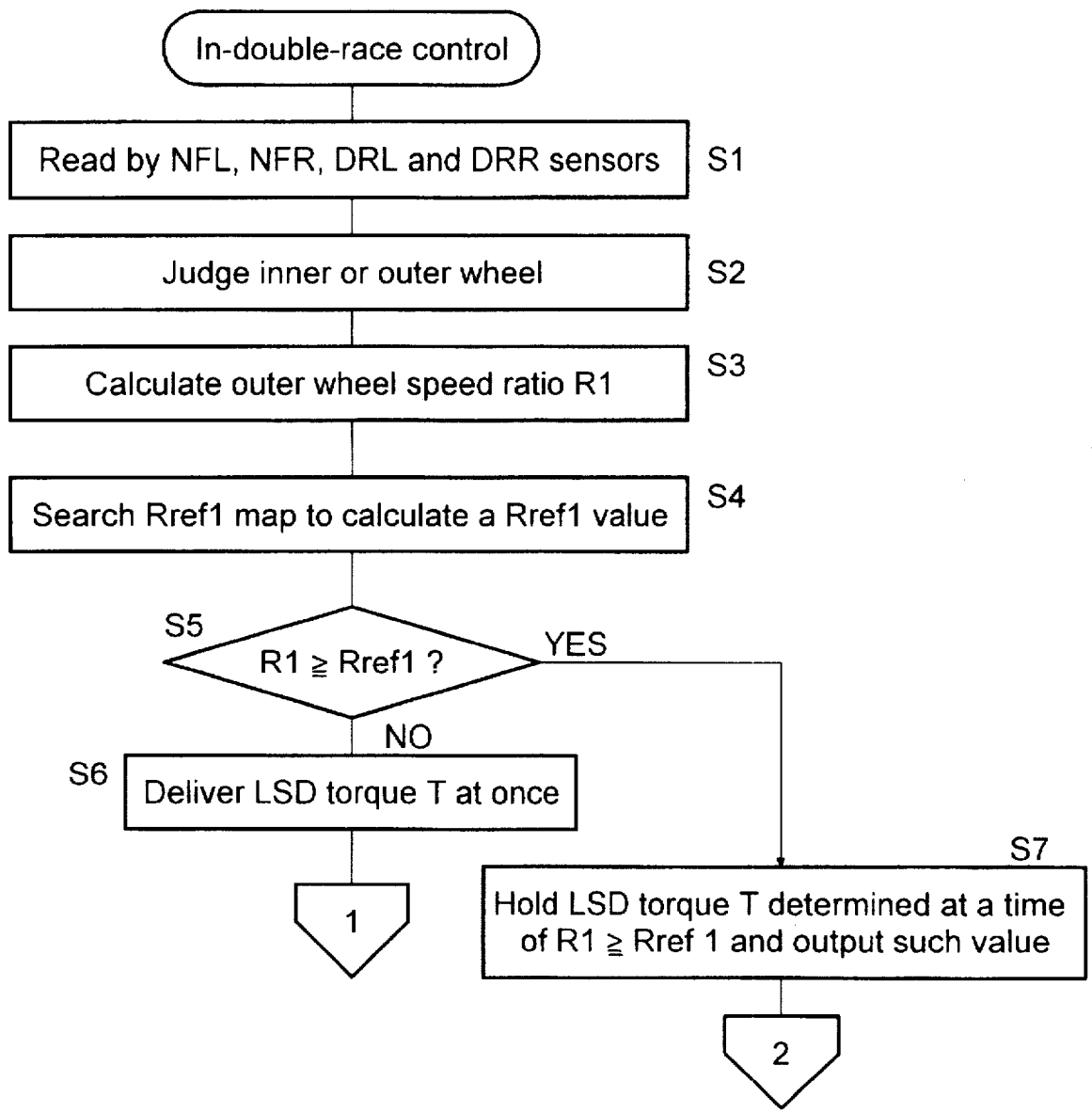
FIG. 7 is a first portion of a flow chart of an in-double-race control routine.
Figure 8:
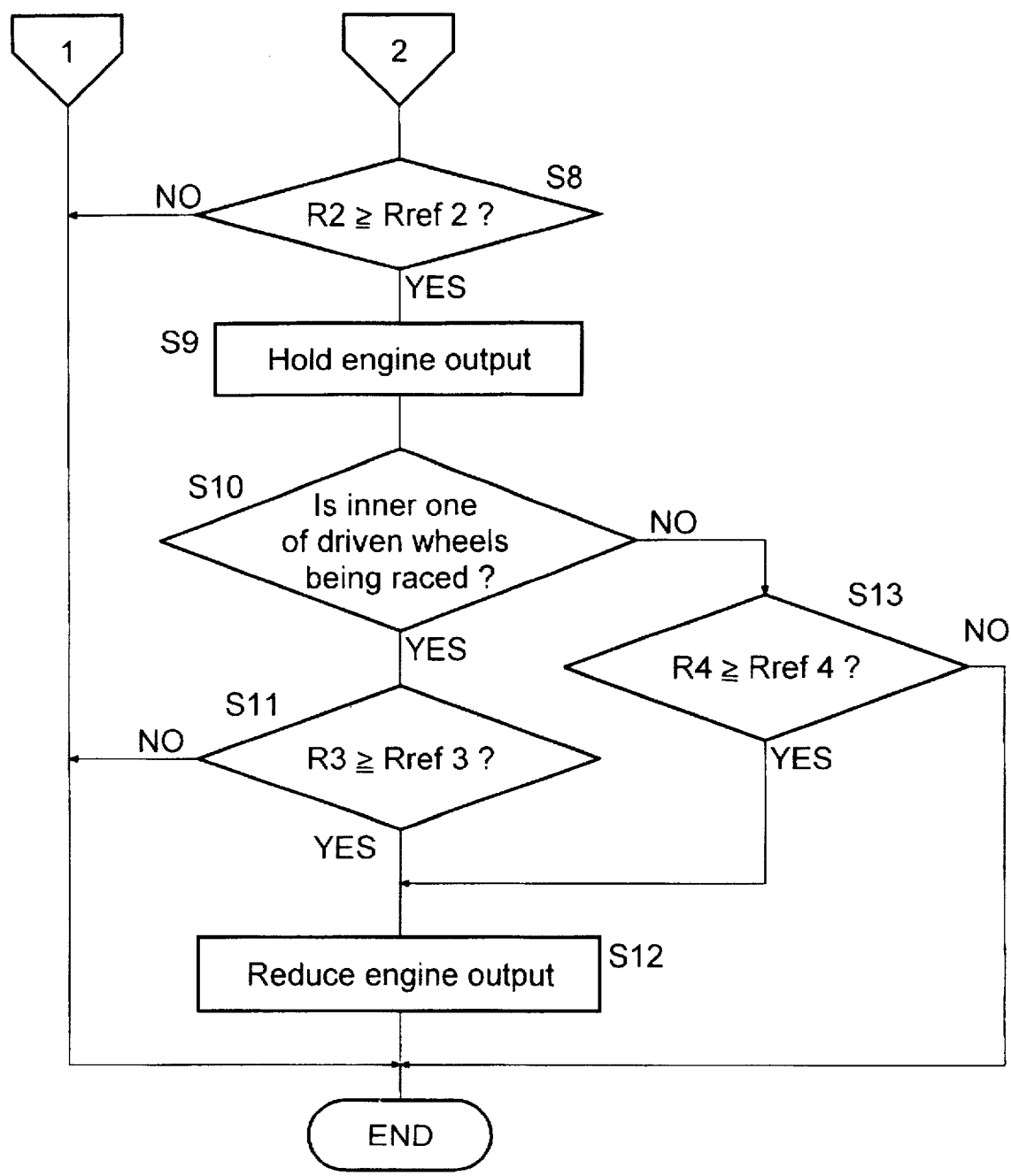
FIG. 8 is a second portion of the flow chart of the in-double-race control routine.

FIGS. 7 and 8 are portions of a flow chart for an in-double-race control routine carried out during turning of the vehicle or the like.

First, the wheel speeds of the four wheels are read by the NFL, NFR, DRL and DRR sensors 12, 13, 10 and 11 (at step S1), and it is determined based on these detection signals which of the pair of left and right rear wheels 3 and 4 as the driven wheels as well as the pair of front wheels 5 and 6 as the follower wheels is the outer wheel (at step S2). Then, an outer-wheel speed ratio between the rear and front wheels, i.e., a detection outer-wheel speed ratio R1 is calculated (at step S3). At the next step S4, a threshold value Rref1 is searched from an Rref1 map.

Figure 9:
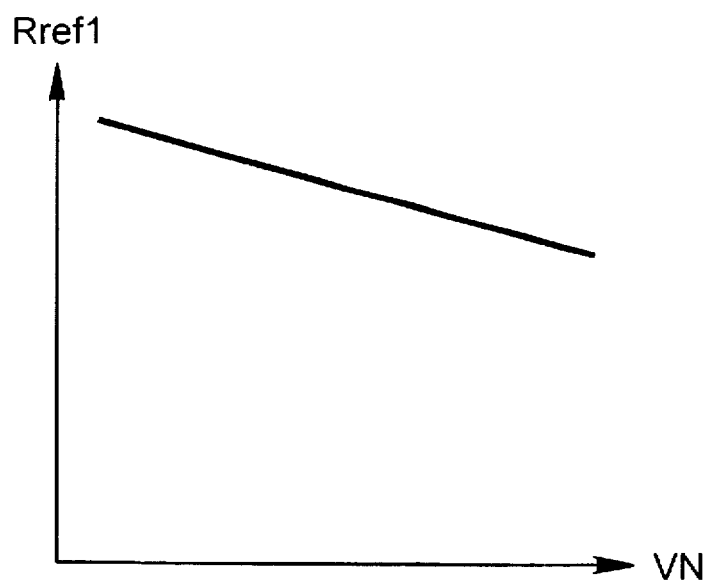
FIG. 9 is an Rredl searching map.
Figure 11:
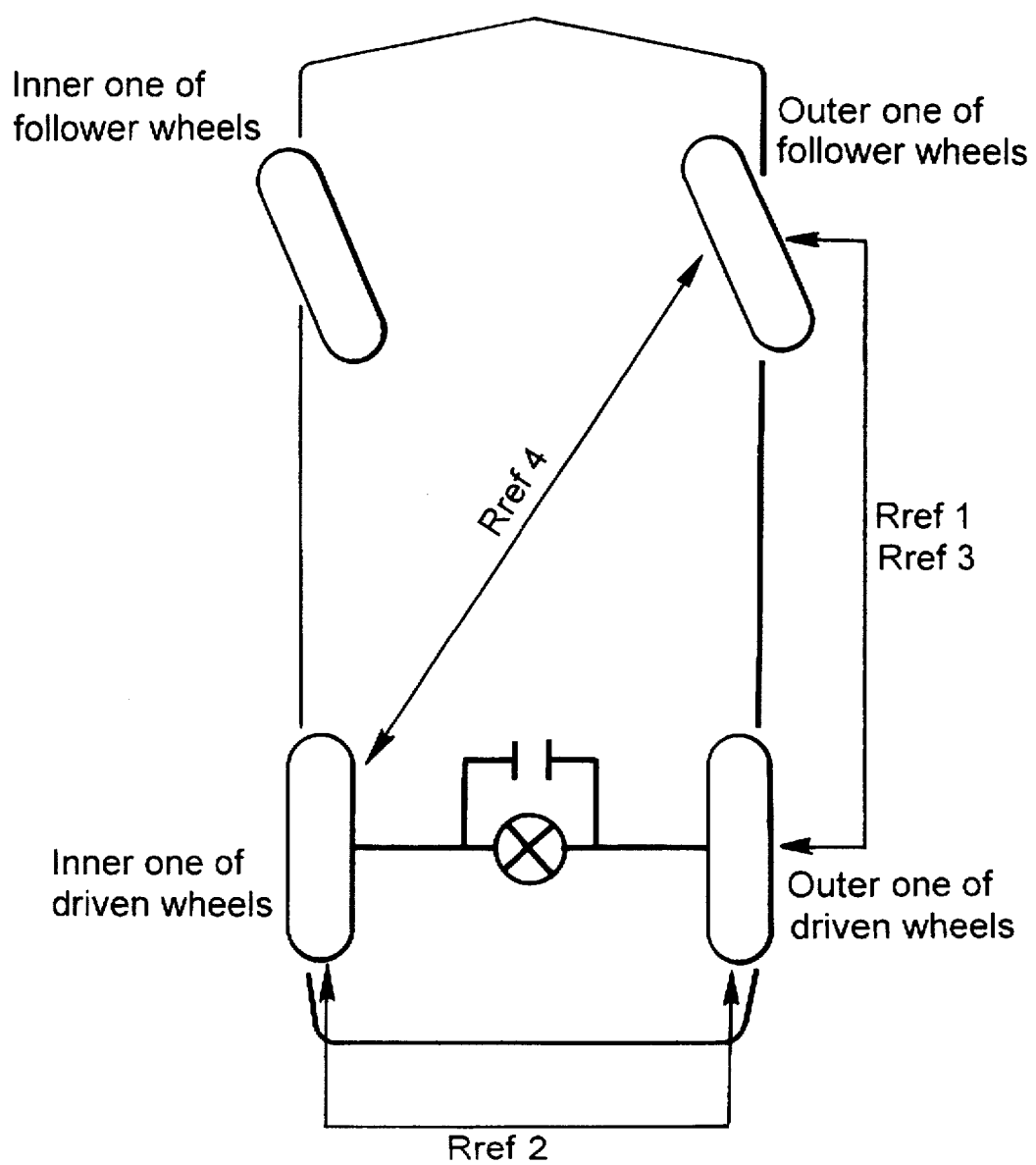
FIG. 11 is a diagram showing reference values of wheel speed ratios.

In the Rref1 map, the map value is provided so that the Rref1 value is decreased in accordance with an increase in vehicle speed VN determined by the detection signals from the NFL and NFR sensors 12 and 13, as particularly shown in FIG. 9. The threshold value Rref1 (see FIG. 11), at which the outer wheel races, is determined in accordance with the vehicle speed VN. Then, the threshold value Rref1 is read by searching the Rref1 map, or is calculated by an interpolation.

At step S5, it is determined whether or not the detection outer-wheel speed ratio R1 is larger than the threshold value Rref1. If NO, the LSD torque T calculated by the multiplying means $21_6$ is output as it is (at step S6). On the other hand, if YES is determined at step S5, it is decided that both wheels are racing, and the LSD torque T is maintained at an LSD torque value determined when the detection outer-wheel speed ratio R1 is the threshold value Rref1, and the LSD torque T is output (at step S7).

Thus, even if both driven wheels are racing during turning of the vehicle, the LSD torque T cannot be reduced and released, and a desired LSD torque is applied. Therefore, the driving performance of the vehicle cannot be reduced, and an uncomfortable vibration cannot be generated from the variable differential operation limiting device 8.

In the above embodiment, when a relation R1≧Rref1 is established, an LSD torque T is provided when $R_1$=Rref1, but it is also preferable that when the above condition is established, an LSD torque T1 (T+ΔT), which is larger by a predetermined valueΔT than the LSD torque T provided when R1=Rref1, is set and output.

Figure 10:
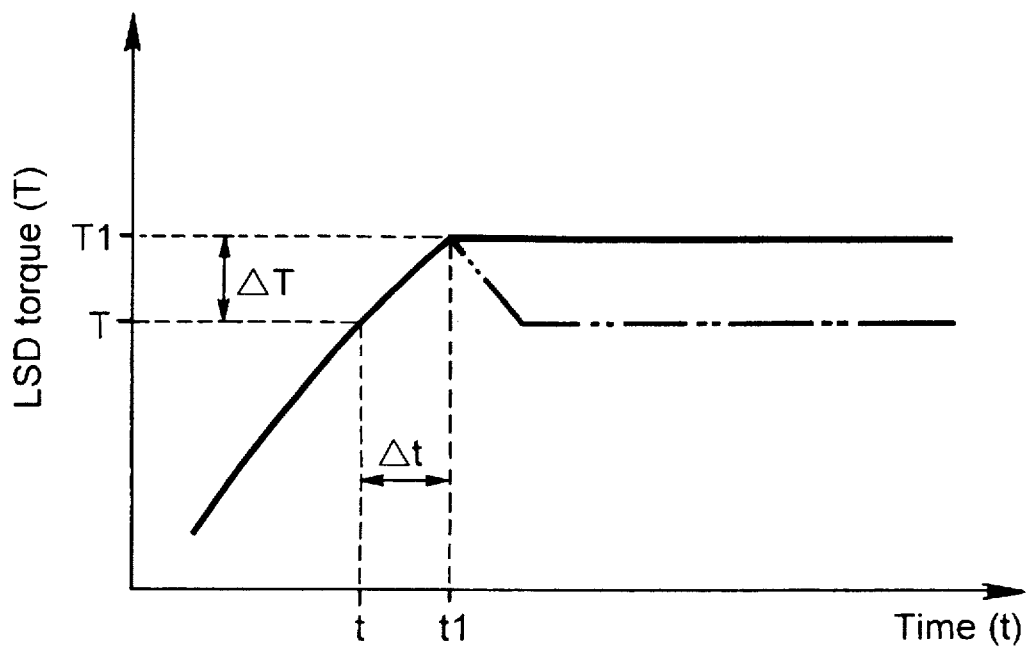
FIG. 10 is a characteristic diagram illustrating a variation in LSD torque with the passage of time.

Specifically, if an LSD torque at the detection of racing of the driven wheel at a time t is represented by T as shown in FIG. 10, an actual LSD torque T1 (=T+ΔT) is delivered after a time lag Δt and as a result, an LSD torque T1 larger than the LSD torque at the detection of the racing is applied to the driven wheel. Namely, if the LSD torque at the detection of the racing is applied, a drop ΔT is produced in the LSD torque, as indicated by a two-dot dashed line, bringing about an instability of the vehicle behavior due to a variation in torque. Thereupon, it is possible to prevent the drop of the LSD torque T by application of the LSD torque larger by ΔT than the LSD torque at the detection of the racing to insure the stability of the vehicle behavior.

When the LSD torque is maintained by the determination that the outer wheel speed ratio R1 is equal to or more than the threshold value Rref1, and both driven wheels are racing, it is determined whether or not the left and right driven wheel speed ratio R2 is larger than a predetermined threshold value Rref2 (see FIG. 11) based on the outputs from the DRL and DRR sensors 10 and 11. If NO, the processing is returned to step S1 (at step S8). On the other hand, if YES is determined at step S8 and if R2≧Rref2, the engine output is maintained at a present value, for example, by maintaining the throttle opening degree or by another means by the operation of a driving-force suppressing (or reducing) device 8a, as shown in FIG. 1, including a well-known traction control device (at step S9).

As described above, at the beginning of an increase in slip rate of the wheel, the variable differential operation limiting device 8 is operated without operation of the traction control device to maintain the LSD torque T at the given value. Therefore, the driving performance of the vehicle can be insured by the LSD torque T. As the slip rate of the vehicle is further increased, the traction control device is operated to hold the engine output. Therefore, excessive slipping of the vehicle can be inhibited to insure the stability of the vehicle.

If the engine output is held at step 29, it is determined whether the left and right driven wheels are in an inner wheel-raced state or an outer wheel-raced state (at step S10). Alternatively, the engine output may be held for a predetermined time (e.g., 1 second) at step S9, and then, passing to step S10, it may be determined whether the left and right driven wheels are in an inner wheel-raced state or an outer wheel-raced state. When the left and right driven wheels are in the inner wheel-raced state which is usually produced, it is determined whether or not a speed ratio between the driven wheel which is an outer wheel during turning of the vehicle and the follower wheel which is an outer wheel during turning of the vehicle, i.e., an outer wheel speed ratio R3, is equal to or larger than a threshold value Rref3 (see FIG. 11) (at step S11). If the outer wheel speed ratio R3 is equal to or larger than a threshold value Rref3 and the slip rate is large, the traction control device is operated to reduce the engine output, for example, by closing the throttle valve or by another means (at step S12). It should be noted that the threshold value Rref3 is set larger than the threshold value Rref1 (Rref3>Rref1) and hence, the reduction of the engine output by the traction control device cannot be carried out prior to holding of the LSD torque by the variable differential operation limiting device.

If the left and right driven wheels are in the outer wheel-raced state due to a special condition such as a split μ road or the like, it is determined whether or not a speed ratio R4 between the outer follower wheel and the inner driven wheel is equal to or larger than a threshold value Rref4 (see FIG. 11) (at step S13). If the speed ratio R4 is equal to or larger than the threshold value Rref4 and the slip rate is large, processing is passed to step S12, at which the reduction of the engine output by the traction control device is carried out.

When the reduction of the engine output by the traction control device is being conducted, the variable differential operation limiting device 8 is holding the LSD torque T and therefore, a variation in vehicle behavior due to the operation of the traction control device and a variation in vehicle behavior due to the variable differential operation limiting device 8 are prevented from being generated concurrently, thereby enabling the stability of the vehicle to be insured. If there is a problem that the slip rate is increased during holding of the LSD torque T to produce an over-revolution of the driven wheel, the traction control device is operated to reduce the engine output and therefore, it is possible to prevent damage to the variable differential operation limiting device 8.

It should be noted that each of the threshold values Rref2 to Rref4 is provided as a map value which is varied in accordance with the vehicle speed, as is the threshold value Rref1. In addition, each of the speed ratios R1 to R4 between the wheels can be replaced by a speed difference between the wheels.

E) Different-Diameter Tire Detection Control

When a usual tire mounted on the vehicle has been punctured and a different-diameter tire carried as a spare tire (a temporary tire) on the vehicle has been mounted in place of the punctured tire, an error is produced in any of the outputs from the DRL, DRR, NFL and NFR sensors 10, 11, 12 and 13, because there is a difference in diameter between the usual tire and the different-diameter tire. Therefore, even if the LSD torque is intended to be controlled based on the outputs from these sensors 10 to 13, an appropriate control is not performed. For this reason, when the mounting of the different-diameter tire has been detected, the application of the LSD torque is stopped or limited.

Figure 12:
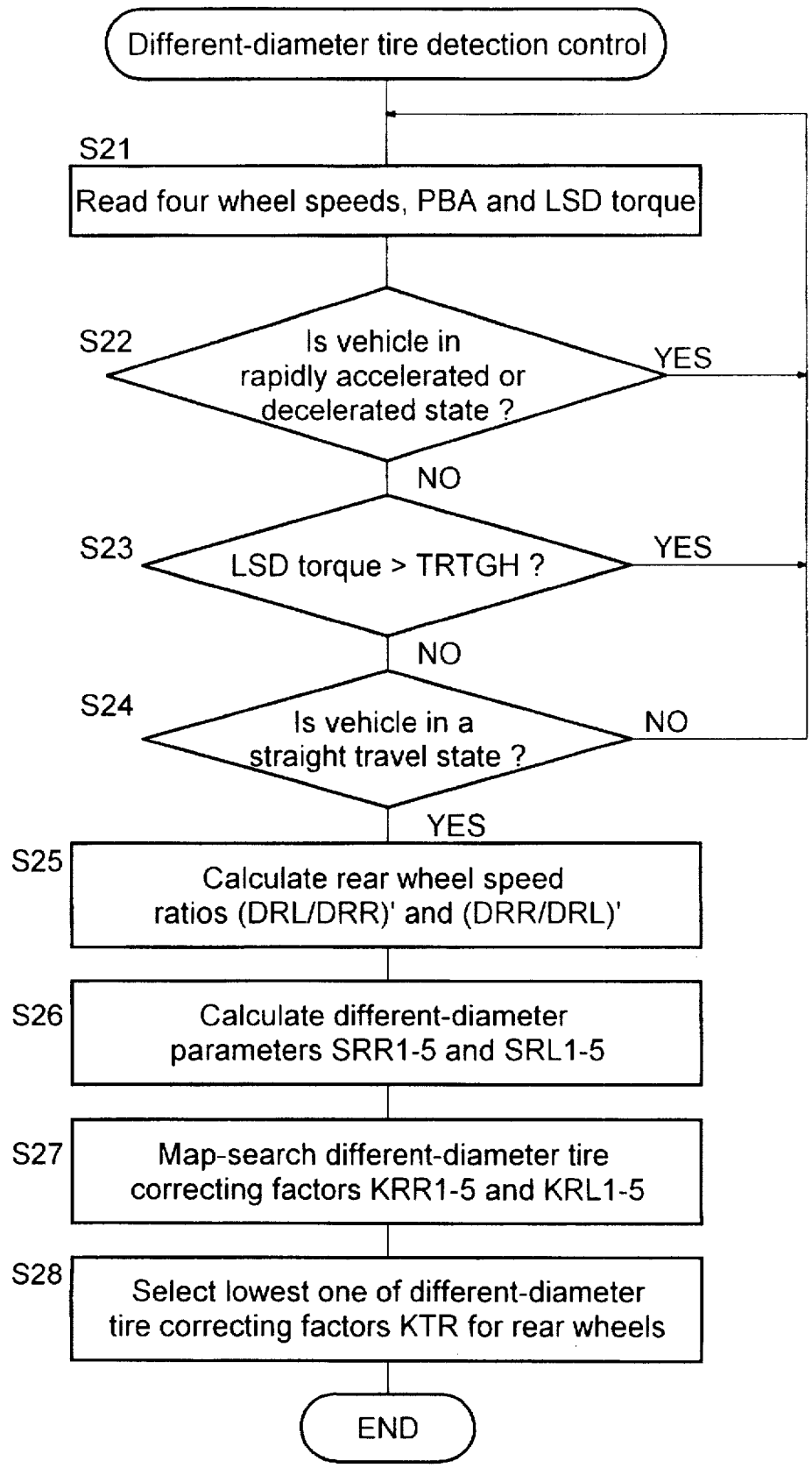
FIG. 12 is a flow chart of a different-diameter tire detection control routine.

FIG. 12 is a flow chart for a different-diameter tire detection control routine. The following is the description of the determination of whether or not a different-diameter tire is mounted on one of the left and right rear wheels (driven wheels).

First, wheel speeds of the four wheels are read by the DRL, DRR, NFL and NFR sensors 10, 11, 12 and 13; an intake pipe internal absolute pressure PBA is read by the PBA sensor 15, and further, at last value of LSD torque T is read (at step S21).

Figure 13:
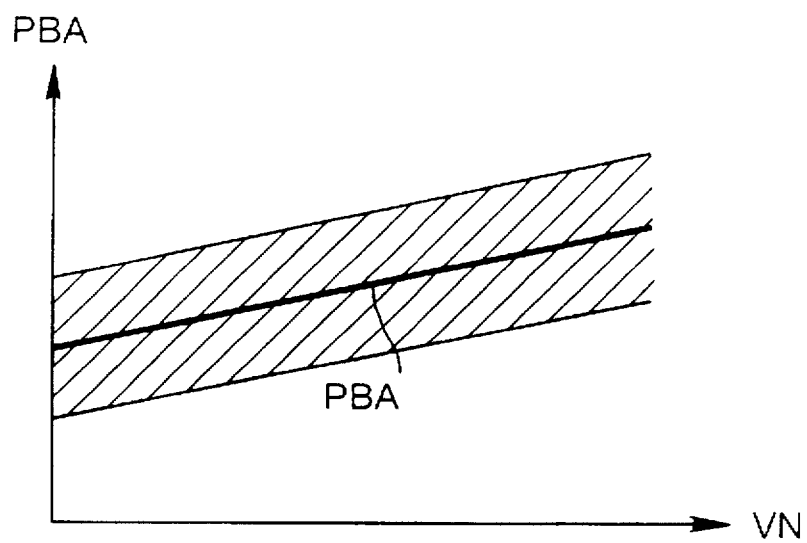
FIG. 13 is a rapid acceleration/rapid deceleration determination map.

Next, it is determined based on a rapid acceleration/deceleration determination map shown in FIG. 13 whether the vehicle is in a rapidly accelerated state or in a rapidly decelerated state (at step S22). The rapid acceleration/deceleration determination map includes zones (indicated by oblique lines) each having a predetermined width and established above and below an intake pipe absolute pressure PBA provided during a steady traveling state in accordance with the vehicle speed VN determined by the detection signals from the NFL and NFR sensors 12 and 13. If the detected intake pipe absolute pressure PBA is out of the zones, it is decided that the vehicle is in the rapidly accelerated state or in the rapidly decelerated state. If YES is determined at step S22 (i.e., if the vehicle is in the rapidly accelerated state or in the rapidly decelerated state), the detection of the different-diameter tire is discontinued for a predetermined time. This is because the slip rate of the wheel is increased if the vehicle is in the rapidly accelerated state or in the rapidly decelerated state and hence, an error is produced in the relationship between the diameter of the tire and the wheel speeds delivered by the NFL, NFR, DRL and DRR sensors 12, 13, 10 and 11, so that the detection of the different-diameter tire is not accurately performed.

Figure 14A:
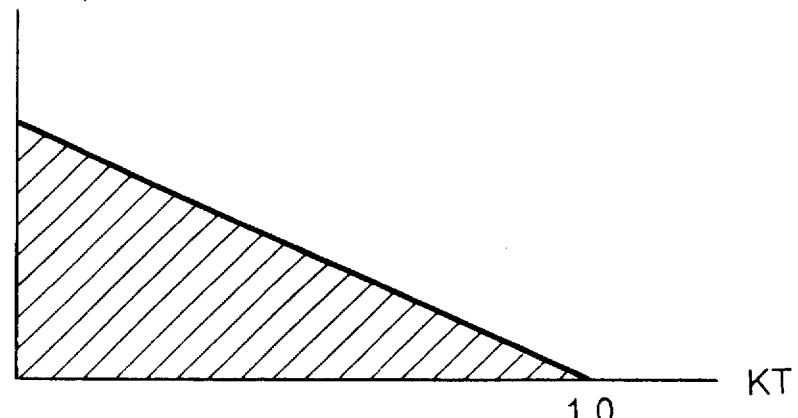
FIGS. 14A and 14B are LSD torque determination maps.

If NO is determined at step S22, it is determined based on an LSD torque determination map shown in FIG. 14A whether or not the last value of LSD torque T exceeds a reference value TRTQH (at step S23). If YES and an LSD torque T larger than the reference value TRTQH is applied, the detection of the different-diameter tire is discontinued for a predetermined time. The magnitude of the reference value TRTQH is variable depending upon the value of the different-diameter tire correcting factor KT (0–1), and determined so that if the value of the different-diameter tire correcting factor KT is small and the LSD torque T is limited, the reference value TRTQH is large, and if the value of the different-diameter tire correcting factor KT is large and the LSD torque T is not limited, the reference value TRTQH is small.

If the slipping of the rear wheels is liable to be produced by application of a large LSD torque, the detection of the different-diameter tire is discontinued. Thus, the detection of the different-diameter tire can be performed accurately. Moreover, because the reference value TRTGH is variable depending upon the operational condition of the vehicle (i.e., depending upon the LSD torque T varied in accordance with the different-diameter tire correcting factor KT), the different-diameter tire can be detected more accurately.

Figure 14B:
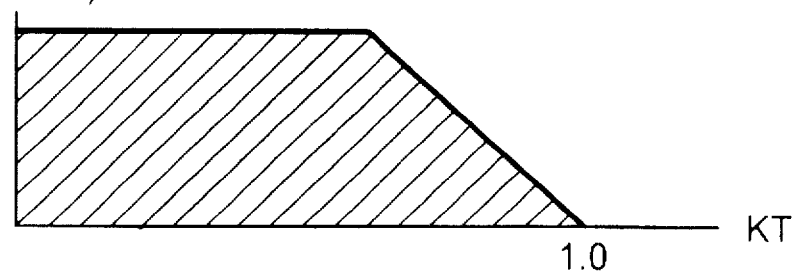

It should be noted that a map shown in FIG. 14B may be used in place of the map shown in FIG. 14A.

Figure 15:
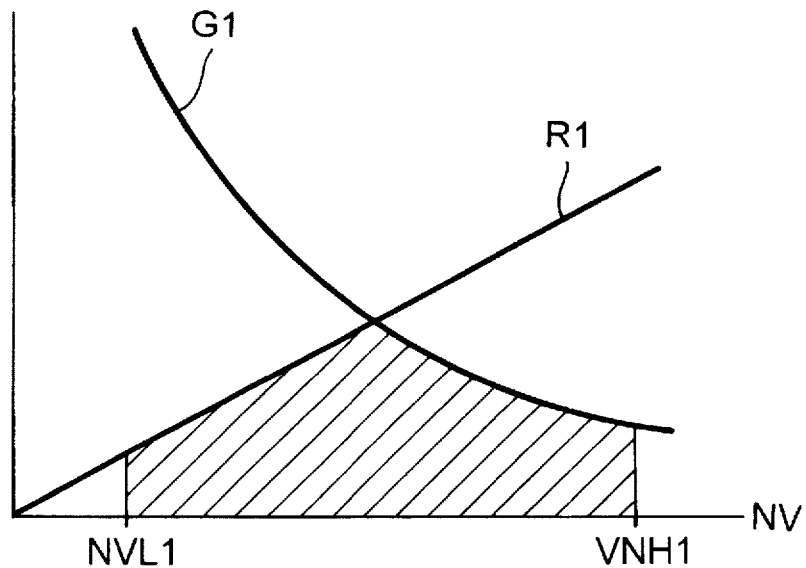
FIGS. 15A and 15B are straight travel determination maps.
Figure 15:
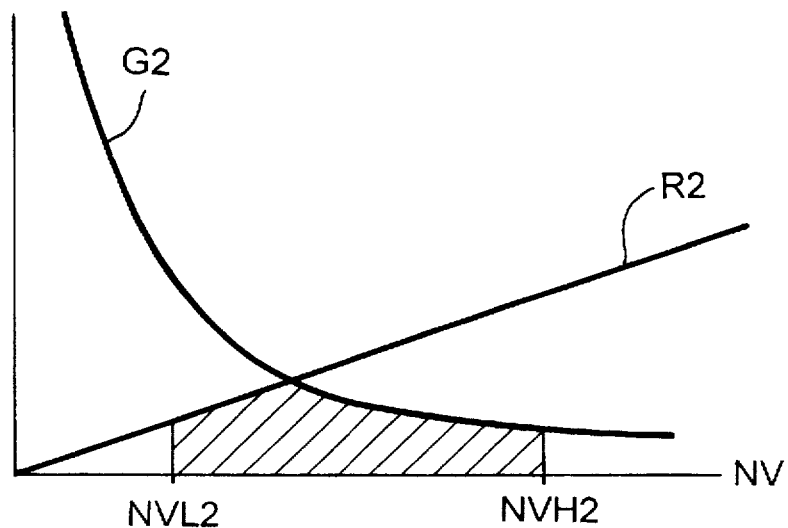

If NO is determined at step S23, it is determined based on a straight travel determination map shown in FIG. 15A whether or not the vehicle is travelling in a straight line (at step S24). This straight travel determination map is established by taking the vehicle speed VN determined by the detection signals from the NFL and NFR sensors 12 and 13 on the axis of the abscissa, and the deviation |NFL–NFR| between the detection signals from the NFL and NFR sensors 12 and 13 (i.e., a difference in speeds between the left and right front wheels) on the axis of the ordinate. If the vehicle speed VN and the difference |NFL–NFR| in speed between the left and right front wheels are in a zone (indicated by the oblique lines in the figure) surrounded by a line of turning radius indicated as value R, a line of vehicle lateral acceleration indicated as value G, a line of vehicle speed VN indicated as value VNL1 and a line of vehicle speed VN indicated as value VNH1, it is decided that the vehicle is traveling in a straight line. Reversely, if the vehicle speed VN and the difference |NFL–NFR| in speed between the left and right front wheels are out of such a zone, it is decided that the vehicle is not traveling in a straight line, and the detection of the different-diameter tire is discontinued for a predetermined time.

The error in the speed ratio of left and right rear wheels can be limited to a level equal to or less than a predetermined value by limiting the turning radius to the value R or less, as described above. In addition, an area with a higher acceleration permitting the lateral slip to be increased can be eliminated by limiting the vehicle lateral acceleration to the value G or less. Further, by setting the vehicle speed VN at a value between the indicated value VNL1 and the indicated value VNH1, it is possible to eliminate a lower-speed area where the vehicle speed is unstable, and to eliminate a higher-speed area where slipping is likely to occur and the LSD control is cut.

If it is decided at steps S22, S23 and S24 that the detection of the different-diameter tire is possible, processing is passed to step S25, where a ratio of the left and right rear wheel speeds is calculated. The rear wheel speed ratios are represented by DRL/DRR and DRR/DRL. Values given by correcting the rear wheel speed ratios by the front wheel speed ratios NFL/NFR and NFR/NFL in consideration of the case where the vehicle is being slightly turned, as determined as final rear wheel speed ratio correction values (DRL/DRR)' and (DRR/DRL)'. That is, the final rear wheel speed ratio correction values are defined by (DRL/DRR)'=DRL/DRR–NFL/NFR and (DRR/DRL)'=DRR/DRL–NFR/NFL.

Figure 16:
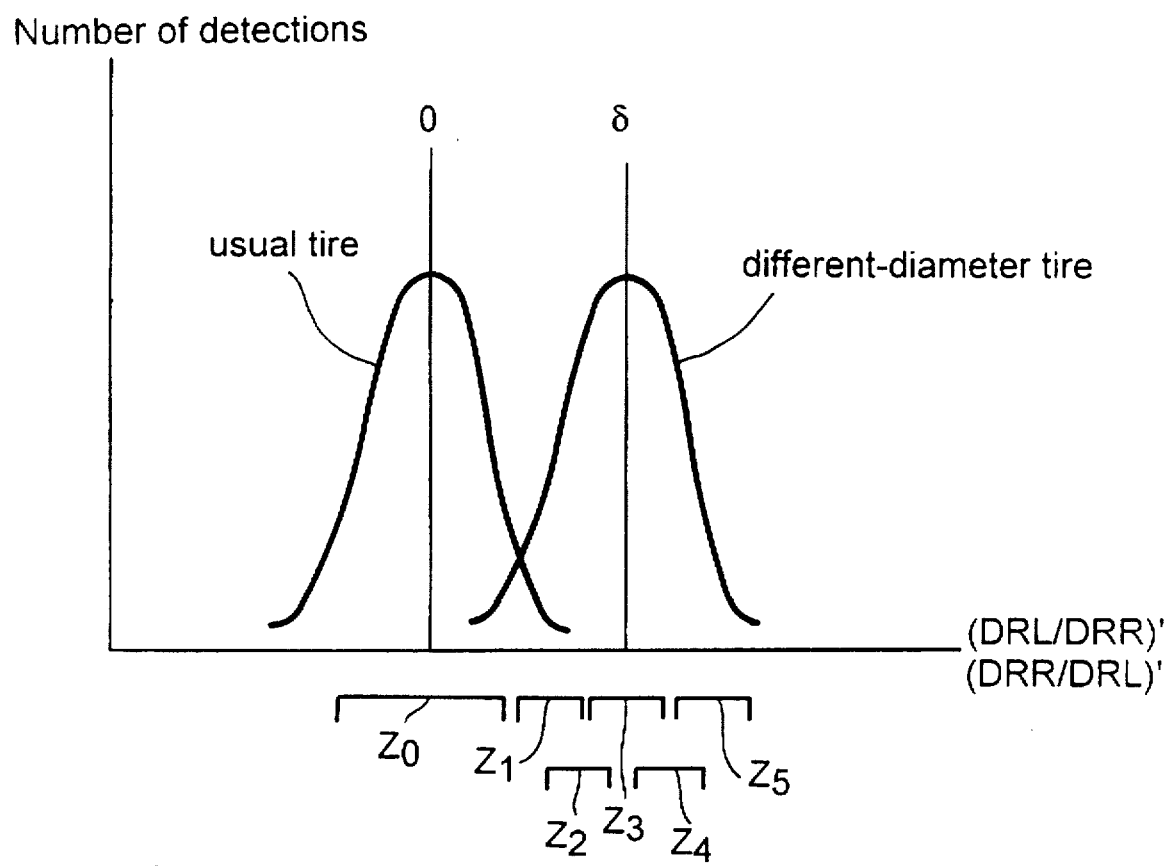
FIG. 16 is a diagram for explaining a method for calculating different-diameter parameters.

Then, each of the rear wheel speed ratio correction values (DRL/DRR)' and (DRR/DRL)' is divided into a plurality of zones, and the frequency of detections in every zone is counted in every loop (at step S26). FIG. 16 is a graph made by taking the rear wheel speed ratio correction value on the axis of the abscissa and the frequency of detections on the axis of the ordinate. In this graph, a zero area Z-0 is established in the vicinity of a rear wheel speed ratio correction value of zero. First to fifth areas $Z_1$ to $Z_5$ are established in the vicinity of a rear wheel speed ratio correction value of δ displaced from zero (a constant determined by the diameter of a usual tire and the diameter of a spare tire). The first to fifth areas $Z_1$ to $Z_5$ are arranged symmetrically with respect to the rear wheel speed ratio correction value of δ and in a mutually overlapped relation.

When both the left and right wheels are usual (i.e., normal) tires, the distribution of detected rear wheel speed ratio correction values (DRL/DRR)' and (DRR/DRL)' is about the rear wheel speed ratio correction value of zero. On the other hand, when the left rear wheel is a spare tire having a smaller diameter, the distribution of the detected rear wheel speed ratio correction values (DRL/DRR)' is about the rear wheel speed ratio correction value of δ. When the right rear wheel is a spare tire having a smaller diameter, the distribution of the detected rear wheel speed ratio correction values (DRL/DRR)' is likewise about the rear wheel speed ratio correction value of δ.

Thus, if the detected rear wheel speed ratio correction value is in any of the first to fifth areas $Z_1$ to $Z_5$, the counted numbers of different-diameter parameters SRR1 to SRR5 and SRL1 to SRL5 corresponding to the areas $Z_1$ to $Z_5$ are incremented. When the detected rear wheel speed ratio correction value (DRL/DRR)' and (DRR/DRL)' is in the zero area Z-0, all of the counted numbers of the different-diameter parameters SRR1 to SRR5 and SRL1 to SRL5 corresponding to the areas $Z_1$ to $Z_5$ are decremented. For example, if it is detected five times that the detected rear wheel speed ratio correction value (DRL/DRR)' and (DRR/DRL)' is in the first area $Z_1$ and it is detected one time that the detected rear wheel speed ratio correction value (DRL/DRR)' and (DRR/DRL)' is in the zero area Z-0, the value of the different-diameter parameter SRR1 corresponding to the first area $Z_1$ is 4 (5–1). If it is detected two times that the detected rear wheel speed ratio correction value (DRL/DRR)' is in the second area $Z_2$ and it is detected seven times that the detected rear wheel speed ratio correction value (DRL/DRR)' is in the zero area Z-0, the value of the different-diameter parameter SRR2 corresponding to the second area $Z_2$ is –5 (2–7). When the value of the different-diameter parameter is a negative number, as in this case, such a value is unconditionally determined as zero.

Figure 17:
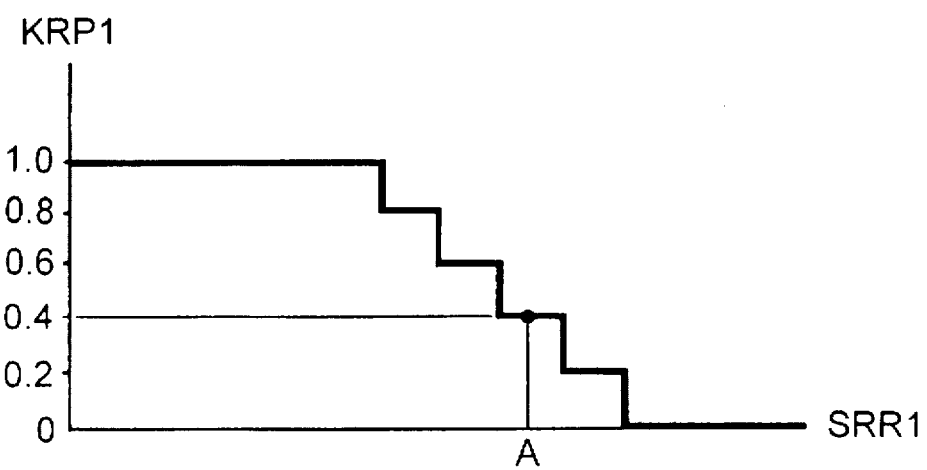
FIG. 17 is a different-diameter tire correcting factor map.

Different-diameter tire correcting factors KRR1 to KRR5 and KRL1 to KRL5 are map-searched (at step S27) for the different-diameter parameters SRR1 to SRR5 and SRL1 to SRL5 determined at step S26. FIG. 17 is one example of a different-diameter tire correcting factor map used for searching of the different-diameter parameter SRR1. If the counted number of the different-diameter parameter SRR1 is small, the value of different-diameter tire correcting factor KRR1 is 1. As the counted number of the different-diameter parameter SRR1 is increased, the value of the different-diameter tire correcting factor KRR1 is decreased 0.2 by 0.2 from 1 toward 0 (zero). For example, if the counted number of the different-diameter parameter SRR1 is a value A shown in FIG. 17, the value of different-diameter tire correcting factor KRR1 is 0.4. In this manner, the values of the different-diameter tire correcting factors KRR1 to KRR5 and KRL1 to KRL5 are map-searched.

Thus, the lowest one of the ten different-diameter tire correcting factors KRR1 to KRR5 and KRL1 to KRL5 determined at step S27 is selected, and its value is determined as a different-diameter tire correcting factor KTR for the rear wheel (at step S28).

Although the procedure for determining the different-diameter tire correcting factor KTR for the rear wheel has been described above in detail, it will be appreciated that when a different-diameter tire is mounted to any of the left and right front wheels, a different-diameter tire correcting factor KTF for the front wheel can be also determined in substantially the same manner.

In place of the deviation |NFL–NFR| between the detection signals from the NFL and NFR sensors 12 and 13 (i.e., the difference in speed between the left and right front wheels), a deviation |DRL–DRR| between the detection signals from the DRL and DRR sensors 10 and 11 (i.e., a difference in speeds between the left and right rear wheels) is taken on the axis of the ordinate of the straight travel determining map (see FIG. 15B) used at step S24 of the flow chart shown in FIG. 12.

While the rear wheel speed ratio correction value has been defined by (DRL/DRR)'=DRL/DRR−NFL/NFR and (DRR/DRL)'=DRR/DRL−NFR/NFL, the front wheel speed ratio correction value is defined by (NFL/NFR)'=NFL/NFR−DRL/DRR and (NFR/NFL)'=NFR/NFL−DRR/DRL at step S25. Further, counted numbers of different-diameter parameters SFR1 to SFR5 and SFL1 to SFL5 are determined at step S26 based on the frequency of detections of front wheel speed ratio correction values (NFL/NFR)' and (NFR/NFL)'. Different-diameter tire correcting factors KFR1 to KFR5 and KFL1 to KFL5 are map-searched at step S27 based on the counted numbers of different-diameter parameters SFR1 to SFR5 and SFL1 to SFL5. Then, the lowest one of the determined different-diameter tire correcting factors KFR1 to KFR5 and KFL1 to KFL5 is selected and determined as a different-diameter tire correcting factor KTF for the front wheel.

The smaller one of the different-diameter tire correcting factor KTR for the rear wheel and the different-diameter tire correcting factor KTF for the front wheel is selected as a final different-diameter tire correcting factor KT. More specifically, if a different-diameter tire is used on the rear wheel, the different-diameter tire correcting factor KTR for the rear wheel is selected and determined as a final different-diameter tire correcting factor KT. If a different-diameter tire is used on the front wheel, the different-diameter tire correcting factor KTF for the front wheel is likewise selected and determined as a final different-diameter tire correcting factor KT.

As apparent from the comparison of the straight travel determining map (see FIG. 15A) used for the detection of the different-diameter tire of the rear wheel (i.e., driven wheel) with the straight travel determination map (see FIG. 15B) used for the detection of the different-diameter tire of the front wheel (i.e., follower wheel), the turning radius is set so that R1>R2; the vehicle lateral acceleration is set so that G1>G2, and the vehicle speed is set so that NVL1<NVL2 and NVH1>NVH2. Thus, the different-diameter tire detecting zone for the rear wheel is wider than the different-diameter tire detecting zone for the front wheel. As a result, the detection of the different-diameter tire of the rear wheel which is the driven wheel provided with the variable differential operation limiting device 8 is preferentially performed prior to the detection of the different-diameter tire of the front wheel which is the follower wheel. This makes it possible to provide an increase in stability of the vehicle and an increase in durability of the variable differential operation limiting device 8.

As described above, it is automatically detected that the different-diameter tire is mounted on the front wheel or the rear wheel. When the different-diameter tire has been detected, the magnitude of the LSD torque T is limited in accordance with the degree of the difference in diameter. Therefore, it is possible to prevent the variable differential operation limiting device 8 from being controlled inappropriately by an erroneous wheel speed signal due to the different-diameter tire and to prevent an excessive load from being applied to the variable differential operation limiting device 8.

F) ABS-correspondence Control

The ABS control for preventing the wheel from being locked and slipped in the course of a braking operation is carried out by an ABS electronic control unit (not shown), but is generally operative independently for the four wheels. If an LSD torque T is applied during operation of the ABS, the ABS control is hindered. Therefore, in the present embodiment, the ABS-correspondence control is carried out to discontinue the application of the LSD torque T during operation of the ABS.

Figure 18:
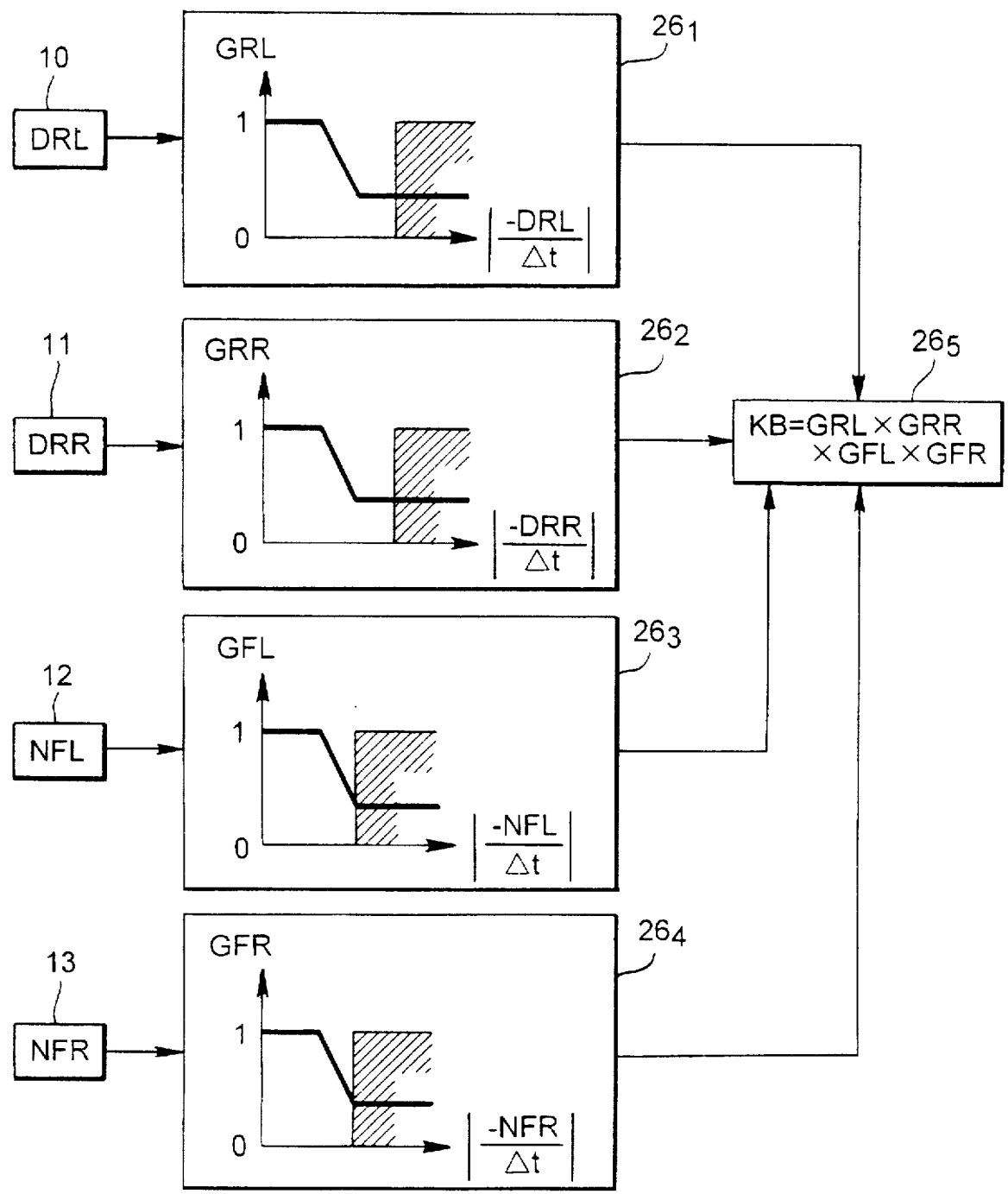
FIG. 18 is a control block diagram of an ABS-correspondence control block.

More specifically, as shown in FIG. 18, the wheel speeds of the left and right rear wheels 3 and 4 as the driven wheels are read by the DRL and DRR sensors 10 and 11, and the wheel speeds of the left and right front wheels as the follower wheels are read by the NFL and NFR sensors 12 and 13. A GRL map $26_1$, and GRR map $26_2$, a GFL map $26_3$ and a GFR map $26_4$, which have been stored in the memory means 14c, are searched to calculate ABS correction values GRL, GRR, GFL and GFR corresponding to these wheel speeds. An obliquely lined area in each of the maps $26_1$ to $26_4$ indicates an ABS-operated area. In the present embodiment, the application of the LSD torque T is discontinued immediately before the operation of the ABS for the left and right rear wheels 3 and 4 as the driven wheels, and the application of the LSD torque T is discontinued immediately after the operation of the ABS for the left and right front wheels 5 and 6 as the follower wheels.

The ABS correction values GRL, GRR, GFL and GFR calculated in the above manner are multiplied together in an ABS-correspondence correcting factor calculating means $25_5$ according to an equation (6) to give an ABS-correspondence correcting factor KB.

$$KB = GRL \times GRR \times GFL \times GFR \qquad (6)$$

Thus, the LSD torque is not released during normal traveling of the vehicle, and can be released immediately before or after the operation of the ABS for one of the four wheels, thereby insuring the controllability of the ABS. The operation of the ABS is varied depending upon behaviors of the four wheels, and such variations can be accommodated only by changing the map values by storing the above-described maps in the memory means 14c.

In addition, in the present embodiment, the LSD torque T is controlled by the map value previously provided in accordance with the deceleration of the wheel speeds independently from the ABS control. Therefore, it is not necessary to discontinue the application of the LSD torque T by a brake switch or by receiving an ABS operating signal, and the need for a communication line between the ABS electronic control unit and the ECU 14 is eliminated, thereby providing a simplification of the system.

G) Hydroplaning Detection Control

Figure 19:
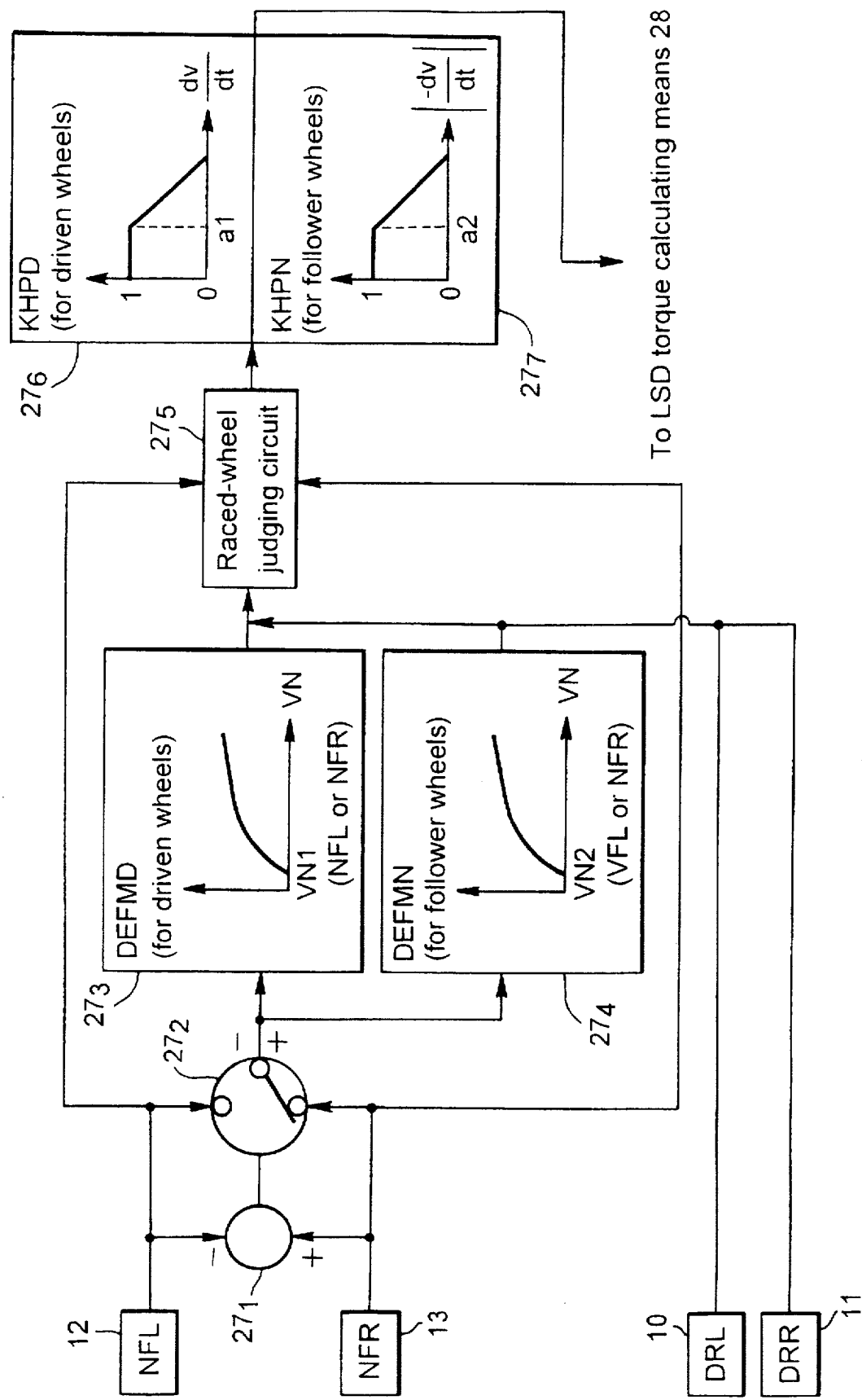
FIG. 19 in a control block diagram of a hydroplaning detection control block.

FIG. 19 is a control block diagram of a hydroplaning detection control block. When the vehicle speed is equal to or more than a predetermined value, the raced wheel of the vehicle is detected. When the acceleration or deceleration of the raced wheel is equal to or more than a predetermined value, it is decided that hydroplaning is produced, and the hydroplaning factor is reduced.

More specifically, the detection signals from the NFL and NFR sensors 12 and 13 are supplied to a comparator means $27_1$, and a vehicle speed VN is determined by a selecting means $27_2$. If the vehicle speed VN is higher than a predetermined vehicle speed, a DEFMD map $27_3$ and a DEFMN map $27_4$, which are stored in the memory 14c, are searched to calculate a target revolution-number different DEFMD for the driven wheels and a target revolution-number difference DEFMN for the follower wheels. In general, if the detection of hydroplaning is conducted by only the vehicle speed VN, there is a possibility of response even to a very small variation in vehicle speed VN. For this reason, the detection control of hydroplaning is performed based on a difference in revolution number between the left and right driven wheels or the left and right follower wheels. In the DEFMD map $27_3$ and the DEFMN map $27_4$, DEFMD and DEFMN values are provided in a parabola with respect to the vehicle speed VN. That is, the target revolution-number difference smoothly follows the variation in vehicle speed VN by smoothly increasing the target revolution-number different for the driven wheels or the follower wheels from a point in time when the vehicle speed VN exceeds a predetermined value VN1 or VN2 (e.g., 50 to 60 km/hr) which permits hydroplaning to be produced.

Output signals from the NFL, NFR, DRL and DRR sensors 12, 13, 10 and 11 are supplied along with the DEFMD and DEFMN values to a raced-wheel judging circuit $27_5$, where it is determined whether or not a wheel is being raced. If the wheel is being raced, the selection of the raced wheel is conducted. When the driven wheel is being raced, an acceleration (dv/dt) of the raced wheel is calculated. When the follower wheel is being raced, a deceleration (−dv/dt) of the raced wheel is calculated.

When the driven wheel is being raced, a KHPD map $27_6$ is searched to calculate a hydroplaning factor KHPD for the driven wheel. When the follower wheel is being raced, a KHPN map $27_7$ is searched to calculate a hydroplaning factor KHPN for the follower wheel. In each of the KHPD may $27_6$ and the KHPN map $27_7$, the map value is provided so that when the acceleration (dv/dt) or the deceleration (−dv/dt) is equal to or more than a predetermined value a1 or a2, the hydroplaning factor KHPD or KHPN is decreased. That is, if the acceleration (dv/dt) or the deceleration (−dv/dt) exceeds the predetermined value a1 or a2, it is decided that hydroplaning is produced, and the hydroplaning factor KHPD or KPHN is decreased.

The hydroplaning factor KHP (KHPD or KHPN), calculated in the above manner, is output to an LSD torque calculating means 28. Thus, the LSD torque is reduced, because the hydroplaning factor KHPD or KHPN is decreased when either the acceleration (dv/dt) or the deceleration (−dv/dt) of the raced wheel exceeds the predetermined value a1 or a2.

Figure 20:
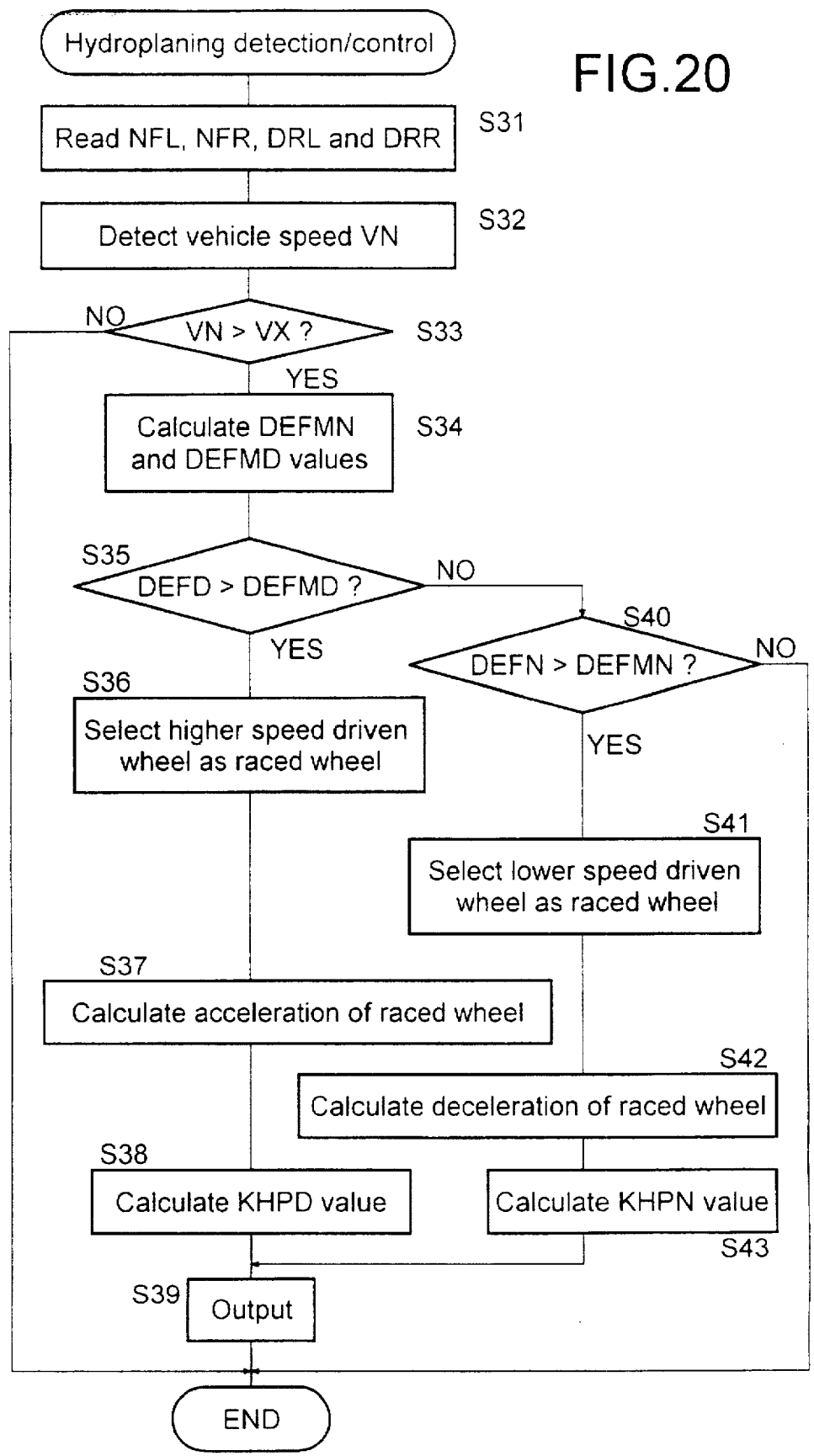
FIG. 20 is a flow chart of a hydroplaning detection control routine.

FIG. 20 is a flow chart of a hydroplaning detecting/controlling routine carried out in the ECU 14.

At step S31, detection signals from the NFL, NFR, DRL and DRR sensors 12, 13, 10 and 11 are read. At step S32, the detection signals from the NFL and NFR sensors 12 and 13 are compared with each other. The larger one of these detection signals is selected as a vehicle speed VN.

It is determined at step S33 whether or not the vehicle speed VN is larger than a predetermined vehicle speed VX. The predetermined vehicle speed VX is set to provide a high speed traveling state in which hydroplaning may be produced, e.g., in a range of 50 to 60 km/hr. If NO is determined at step S33, it is decided that hydroplaning is not produced, thereby completing this program.

On the other hand, if YES is determined at step S33, it is decided that hydroplaning can be produced, advancing to step S34 and subsequent steps. At these steps, it is determined based on the difference in revolution number between the left and right driving or follower wheels whether or not hydroplaning is produced, and a hydroplaning factor KHP corresponding to the vehicle behavior is calculated to control LSD torque T.

More specifically, at step S34, the DEFMD map $24_3$ and the DEFMN map $24_4$ (see FIG. 19) are searched to calculate target revolution-number differences corresponding to the vehicle speed VN for both of the driving and follower wheels, i.e., a target revolution-number difference DEFMD for the driven wheels and a target revolution-number difference DEFMN for the follower wheels. Then, it is determined whether or not an actual revolution-number difference for the driven wheels is larger than the target revolution-number difference DEFMD for the driven wheels (at step S35). If YES, it is decided that the driven wheel is being raced, and one of the left and right driven wheels in their accelerated states, which is larger in revolution-number, is selected as a raced wheel (at step S36).

Then, an acceleration (dv/dt) of the raced wheel selected at step S36 is calculated at step S37, and the KHPD map is searched at step S38 to calculate a driven wheel-side hydroplaning factor KHPD according to the acceleration (dv/dt) of the raced wheel. This driven wheel-side hydroplaning factor KHPD is output to the LSD torque calculating means 28, thereby completing the program.

If NO is determined at step S35, processing is advanced to step S40, at which it is determined whether or not the actual revolution-number difference DEFN for the follower wheels is larger than the target revolution-number difference DEFMN for the follower wheels. If NO, the program is completed at once. On the other hand, if YES is determined at step S35, it is decided that the follower wheel is being raced, and one of the left and right follower wheels in their decelerated state, which is lower in revolution-number, is selected as a raced wheel (at step S41).

Then, a deceleration (−dv/dt) of the raced wheel selected at step S41 is calculated at step S42, and the KHPN map is searched at step S43 to calculate a hydroplaning factor KHPN corresponding to the deceleration (−dv/dt) of the raced wheel, which is output to the LSD torque calculating means 28, thereby completing the program.

Thus, it is possible to promptly reduce the LSD torque based on the acceleration or deceleration of the raced wheel which is the driven wheel or the follower wheel before the wheels are brought into racing states, thereby insuring the driving performance of the vehicle and the stability of the vehicle behavior during high speed traveling of the vehicle.

Although the hydroplaning detection control has been carried out based on the difference in revolution number between the left and right wheels in the above-described embodiment, it will be appreciated that the hydroplaning detection control may be conducted on the basis of any other factor relating to the revolution number, e.g., on the basis of a revolution-number ratio between the left and right wheels in place of the difference in revolution number between the left and right wheels.

Thus, even after the LSD torque T is held at the predetermined value by conducting the in-double-race control prior to the different-diameter detection control (see FIG. 2), the ABS-correspondence control and the hydroplaning detection control as described above, the LSD torque T can be cut by the different-diameter detection control, the ABS-correspondence control or the hydroplaning detection control. However, provided that the in-double-race control is conducted after the different-diameter detection control, the ABS-correspondence control and the hydroplaning detection control, it fails to conduct the control of cutting the LSD torque T in the current loop, if the LSD torque T is held at the predetermined value by the in-double-race control in the last loop.

Although the embodiment of the present invention has been described in detail, it will be understood that the present invention is not limited to the above-described embodiment, and various modifications in design may be made without departing from the spirit and scope of the invention defined in the claims.

For example, the vehicle in which the torque is distributed to the left and right driven wheels has been illustrated, but the present invention is applicable to a vehicle in which the torque is distributed to the front and rear driven wheels. The traction control device is not limited to a device which controls the engine output to reduce the driven wheel torque. The traction control device may be a device which reduces the driven wheel torque by the operation of the brake device.

As discussed above, according to the present invention, the quantity of operation of the driving-force distributing device during racing of both the driven wheels is maintained at a value corresponding to the quantity of operation obtained upon detection of the racing. Therefore, it is possible to insure the stability of the vehicle and to operate the driving-force reducing device after the quantity of operation of the driving-force distributing device has been maintained. Thus, the variation in state due to the operation of the driving-force distributing device and the variation in state due to the operation of the driving-force reducing device are not concurrently generated, thereby making it possible to prevent the vehicle behavior from becoming unstable which insures the stability of the vehicle.

What is claimed is:

1. A driving-force control system for a vehicle having an engine and driven wheels driven by an output of said engine, said driving force control system for controlling an operation of a driving-force distributing device for adjusting a distribution of a driving force between said driven wheels, as well as for controlling an operation of an engine output suppressing device for suppressing the engine output for the driven wheels, said driving-force control system comprising:

a first control means for maintaining a quantity of operation of said driving-force distributing device during racing of both said driven wheels at a value corresponding to a quantity of operation provided upon detection of the racing; and a second control means for enabling the operation of said engine output suppressing device, only when the quantity of operation of said driving-force distributing device is maintained by said first control means.

2. A drive-force control system according to claim 1, further comprising a travel-state determining means for determining if the vehicle is traveling at a first predetermined speed and an at-start control torque calculating means for determining an at-start control torque when the travel-state determining means determines the vehicle is traveling at a speed less than said first predetermined value.

3. A drive-force control system according to claim 2, wherein said at-start control torque calculating means calculates a torque based upon an intake pipe internal absolute pressure and an engine revolution-number.

4. A drive-force control system according to claim 2, further comprising in-travel control torque calculating means for determining a torque when the vehicle is traveling at a speed greater than said first predetermined value.

5. A drive-force control system according to claim 1, wherein said first control means includes means for determining which wheels are inner wheels and which are outer wheels during turning of the wheel, means for determining outer-wheel speed ratio between the rear and front wheels, means for determining a threshold value at which the outer wheels race based upon the vehicle speed, and means for determining if the outer-wheel speed ratio is greater than the threshold value.

6. A drive-force control system according to claim 5, wherein said second control means includes means for maintaining a torque value, determined when the outer wheel speed ratio is equal to or more than the threshold value, during racing of both the outer wheels.

7. A drive-force control system according to claim 6, wherein said second control means includes means for determining if the left and right driven wheel speed ratio is larger than a second threshold value, means for determining if the left and right driven wheels are in an inner wheel-raced state or outer wheel-raced state, means for determining if outer wheel speed ratio is larger than a third threshold value when in the inner wheel-raced state and means for determining if inner wheel speed ratio is larger than a fourth threshold value when in the outer wheel-raced state.

8. A drive-force control system for a vehicle for controlling an operation of a driving-force distributing device for adjusting a distribution of a driving force between driven wheels, as well as for controlling an operation of a driving-force reducing device for reducing the driving force for the driven wheels, said driving-force control system comprising:

a first control means for maintaining a quantity of operation of said driving-force distributing device during racing of both said driven wheels at a value corresponding to a quantity of operation provided upon detection of the racing;

a second control means for enabling the operation of driving-force reducing device, when the quantity of operation of said driving-force distributing device is maintained by said first control means;

a travel-state determining means for determining if the vehicle is traveling at a first predetermined speed and an at-start control torque calculating means for determining an at-start control torque when the travel-state determining means determines the vehicle is traveling at a speed less than said first predetermined value;

in-travel control torque calculating means for determining a torque when the vehicle is traveling at a speed greater than said first predetermined value, wherein said in-travel control torque calculating means includes a driving-force control means for calculating an engine driving-force control torque based upon an intake pipe internal absolute pressure and wheel speeds, a vehicle speed/engine brake control means for determining a vehicle speed/engine brake control based upon a vehicle speed and an intensity of engine brake, a wheel speed ratio control means for determining a wheel speed ratio control torque based upon number of revolutions of driven wheels and follower wheels, a different-diameter tire detection control means for determining a correction factor for stopping or for reducing application of said torque upon determining that different diameter tires are mounted on wheels of the vehicle, an antilock brake control means for maintaining the torque at a predetermined value when the antilock brake system is applied, and a hydroplaning detection control means for detecting hydroplaning and for determining a hydroplaning correction factor when hydroplaning is detected.

9. A drive-force control system according to claim 8, wherein said driving-force control means determines said engine driving-force control torque based upon a) a basic driving-force control torque based upon intake pipe internal absolute pressure and a variation rate thereof, b) a timing for application of torque from a wheel speed ratio during turning of the vehicle, and c) the basic-driving force control torque corrected by the vehicle speed and the engine revolution-number.

10. A drive-force control system according to claim 8, wherein said vehicle speed/engine brake control means calculates torque based upon the vehicle traveling at a high speed and in a straight line and upon the vehicle decelerating while turning.

11. A drive-force control system according to claim 8, wherein said wheel speed ratio control means compares wheel speeds of said follower wheels to determine if the vehicle is turning counterclockwise or clockwise and calculates a control torque based upon the wheel speed ratio.

12. A drive-force control system according to claim 8, wherein said different-diameter tire detection control means determining different-diameter tires are mounted based upon wheel speed of the wheels of the vehicle, intake pipe internal absolute pressure and current torque.

13. A drive-force control system according to claim 8, wherein said antilock brake control means maintains the torque at a predetermined value based upon the wheel speeds of the wheels and calculates an antilock brake correspondence correcting factor based on the wheel speeds.

14. A drive-force control system according to claim 8, wherein said hydroplaning detection control means determines hydroplaning based upon acceleration or deceleration of a raced wheel.

15. A driving-force control system for a vehicle having an engine, driven wheels driven by an output of said engine, and follower wheels, said driving-force control system for controlling an operation of a driving-force distributing device for adjusting a distribution of a driving force between said driven wheels, as well as for controlling an operation of an engine output suppressing device for suppressing the engine output for the driven wheels, said driving-force control system comprising:

a first control means for maintaining a quantity of operation of said driving-force distributing device during racing of both said driven wheels at a value corresponding to a quantity of operation provided upon detection of the racing;

a second control means for maintaining said engine output for a predetermined period of time by the operation of said engine output suppressing device, only when the quantity of operation of said driving-force distributing device is maintained by said first control means; and a third control means for reducing the engine output by the operation of said engine output suppressing device when a wheel speed ratio between outer wheels of said driven and follower wheels during turning of the vehicle exceeds a predetermined value in a case wherein an inner wheel of the driven wheels is in a racing state after the engine output has been maintained for said predetermined period of time by said second control means.

16. A driving-force control system for a vehicle having an engine, driven wheels driven by an output of said engine, and follower wheels, said driving-force control system for controlling an operation of a driving-force distributing device for adjusting a distribution of a driving force between said driven wheels, as well as for controlling an operation of an engine output suppressing device for suppressing the engine output for the driven wheels, said driving-force control system comprising:

a first control means for maintaining a quantity of operation of said driving-force distributing device during racing of both said driven wheels at a value corresponding to a quantity of operation provided upon detection of the racing;

a second control means for maintaining said engine output for a predetermined period of time by the operation of said engine output suppressing device, only when the quantity of operation of said driving-force distributing device is maintained by said first control means; and a third control means for reducing the engine output by the operation of said engine output suppressing device when a wheel speed ratio between an inner wheel of said driven wheels and an outer wheel of said follower wheels during turning of the vehicle exceeds a predetermined value in a case wherein an outer wheel of the driven wheels is in a racing state after the engine output has been maintained for said predetermined period of time by said second control means.

* * * * *